United States Patent [19]

de Goede

[11] Patent Number: 5,313,496

[45] Date of Patent: May 17, 1994

[54] DIGITAL DEMODULATOR CIRCUIT

[75] Inventor: Grant M. de Goede, Redondo Beach, Calif.

[73] Assignee: TRW Inc., Redondo Beach, Calif.

[21] Appl. No.: 633,926

[22] Filed: Dec. 26, 1990

[51] Int. Cl.$^5$ .............................. H04L 27/06
[52] U.S. Cl. .............................. 375/95; 375/99
[58] Field of Search ............... 375/55, 87, 94, 95, 375/7, 8, 99; 371/28, 57.2, 62; 329/311

[56] References Cited

U.S. PATENT DOCUMENTS

| | | | |
|---|---|---|---|
| 3,723,879 | 3/1973 | Kaul et al. | 375/8 |
| 4,242,755 | 12/1980 | Gauzan | 375/95 |
| 4,317,221 | 2/1982 | Toya | 375/7 |
| 4,438,407 | 3/1984 | Kemmesies | 375/94 |
| 4,504,960 | 3/1985 | Yamada | 375/94 |
| 4,675,884 | 6/1987 | Nakamura et al. | 375/84 |
| 4,745,626 | 5/1988 | Wells | 375/94 |

*Primary Examiner*—Stephen Chin
*Attorney, Agent, or Firm*—Ronald L. Taylor

[57] ABSTRACT

An improved demodulator recovers data symbols from a serial data stream comprising digital bits and outputs said data symbol in parallel data format. The demodulator includes sampling means to take multiple samples of each data bit in the received serial data stream, correcting any irregularity in the duration of the bit, and from those samples reconstructs a parallel data stream. A companion modulator serves to transform a parallel data stream in the serial data form. Together the modulator and demodulator are formed within a single substrate of semiconductor material. The modulator demodulator serves preferably as elements of a media access controller for a fiber optic transmission system that transmits data at rates of 100 Mhz.

28 Claims, 16 Drawing Sheets

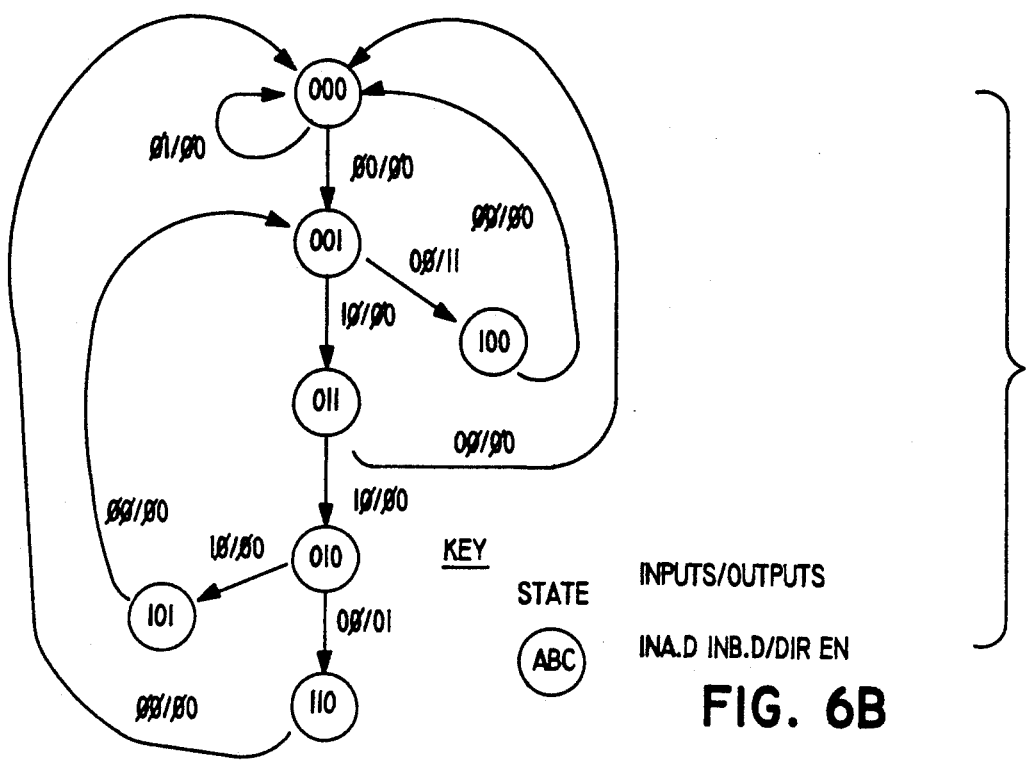
FIG. 6B
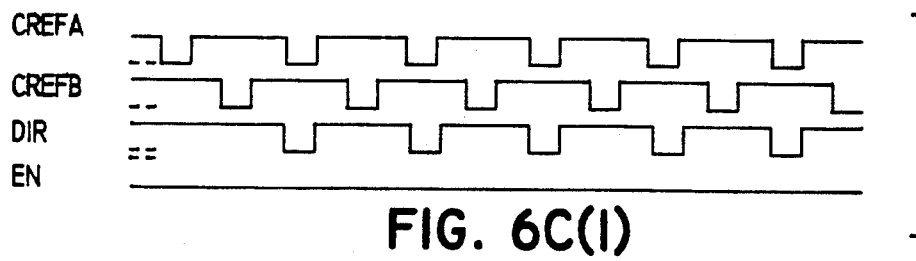
FIG. 6C(1)
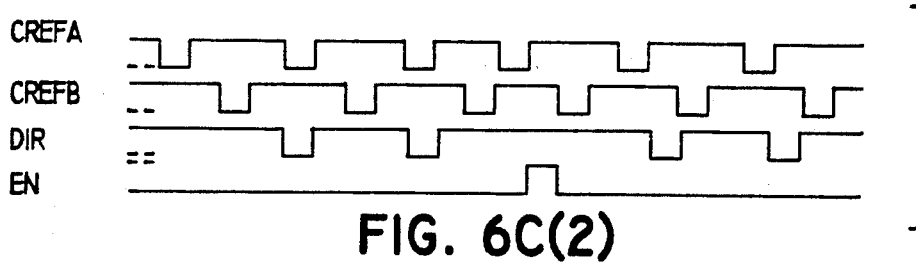
FIG. 6C(2)
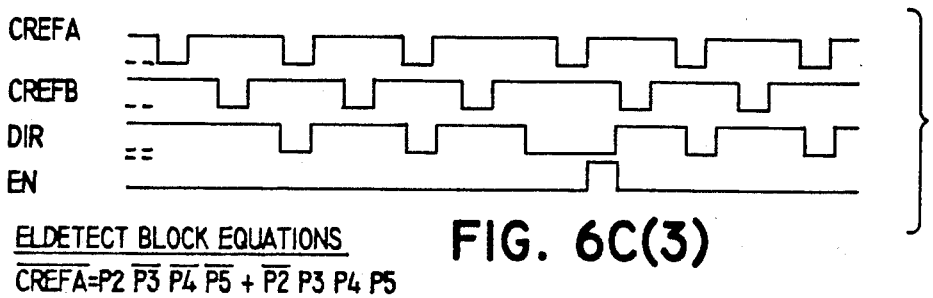
FIG. 6C(3)
ELDETECT BLOCK EQUATIONS
$\overline{CREFA} = P2\ \overline{P3}\ \overline{P4}\ \overline{P5} + \overline{P2}\ P3\ P4\ P5$
$\overline{CREFB} = \overline{P2}\ \overline{P3}\ \overline{P4}\ P5 + P2\ P3\ P4\ \overline{P5}$

DIGITAL DEMODULATOR CIRCUIT

FIELD OF THE INVENTION

This invention relates to modulator/demodulator circuits, and, more particularly, to a solid state monolithic digital modulator for high speed local area data communications.

BACKGROUND

The serial transmission of data electronically in digital form as enables computer to computer communication is known and is in wide spread use. In that transmission, information is encoded in digital form, typically through use of the binary code consisting of a series of "ones", or highs, and "zeros", or lows, with each group of a predetermined number of consecutive bits in the serial transmission, such as 5, representing a symbol and a group of such symbols representing a "frame" or message. At the receiving end, the coded information is decoded and processed into a form useable by other electronic apparatus for processing, and/or control or display. As those skilled in the art recognize, the media used for data transmission can be of many types, typically copper wires, and in more modern systems fiber optic cables. With fiber optic cables the encoded information is converted into modulation of light; turning the light on and off at high rates so as to represent the digital information.

This latter type of medium has been recognized as the preferred form of transmission line for data transmission purposes in the local area networks, LAN, in which a large number of stations are effectively "tied" together; one station can send digital information to other stations in the loop or network, and, likewise receive information addressed to the respective station by any other station in that loop.

Professional users of network computers are familiar with the local area network as incorporated within the modern business or office for allowing communications between computers. Those networks, however, have other more critical application in military networks and, particularly, in space satellites. As those skilled in the art appreciate, a fiber optic local area data network replaces heavy and bulky wire harnesses and cabling systems. By allowing many stations to use the same transmission line and permit individual addressing of a particular station along the loop, the need for a cabling system wired between each station and every other station so as to allow direct communication, is avoided, as was recognized many years ago with the Digital Equipment Company PDP-11 System. In spacecraft applications weight is at a premium. Hence, the elimination of heavy and bulky transmission line harnesses, common to present spacecraft, is a desireable end.

The fiber optic transmission medium permits greater band width, hence, greater data transmission rates, than ordinary copper wire transmission lines. Hence, with the recent introduction and application of fiber optic systems higher data transmission rates are being achieved with which to allow more efficient and productive use of the transmission medium. Greater amounts of data may be sent and/or received in shorter periods of time. In a local area network, thus, each computer or station in the network can complete its transmission or reception more quickly, allowing the other stations in the loop to do so as well. Further, with higher data transmission speeds, accordingly, a greater number of stations may be incorporated within any given network.

As those skilled in the art recognize, a given electronic device, such as a computer, consists of many different sections that are electrically wired together. With high speed data transmission fiber optic loops it is conceivable that the individual sections of such electronic device may be connected together over a single fiber optic cable in a local area network, eliminating the copper wiring between circuits. To assure that data transmission equipment of one manufacturer is compatible with, that is may "speak to", data transmission equipment of a different manufacturer, the manufacturer's adhere to industry accepted standards in the design and operation of their equipment. For this purpose, the American National Standards for industry has established a specification for a fiber-distributed data interface, FDDI, ANSI X3T9 Series 3.1.39, which specifies the protocol and tolerances for LAN digital signal communications in the fiber optic media. That standard specifies a non-return-to-zero, NRZI, indication. The protocol requires a modulator demodulator circuit that processes data into a serial stream for transmission over a media and successfully recovers the data at the destination at rates of 100 million information bits per second and an acquisition capability within twelve symbol periods or less.

In such a data transmission system there is no separate synchronizing circuit, as would signal the receiving station separate via a separate transmission path that a symbol is to start or that message is being started and sent. The receiving station must, on its own, determine from the serial data stream presented on the network that there is data on the network being transmitted, must derive a clock signal with which to enable the determination of a start of symbol operation in the data and must decode the data so as to ascertain whether the selected station is the addressee and, if so, decode the message. To do so, the cited standards require that the receiving equipment "acquire" the incoming signal within twelve symbol periods or less for un-encoded data rates of at least 100 million bits per second. Digital modulator/demodulator circuits for performing these functions at those rates are commercially available. However, those circuits all rely upon an analog phased-lock loop recovery method. While phased-lock loop type oscillator circuits have received wide application in digital communications systems, and serve an almost indispensable part of present day systems, they have limitations.

Analog phased-locked loops are subject to degradation over long periods of time, such as, for example, the ten to fifteen year period in which space satellites on a long mission explores the cosmos. Phase locked loop oscillators are also subject to degradation through exposure to both naturally occurring and militarily induced radiation, such as occurs in parts of the stellar system and/or which might be released as energy by an atomic blast. Whereas failure of the phased-locked loop oscillator in business and office local area networks, though inconvenient, is easily repaired by telephoning the technician and giving him immediate access to the system parts. However, repair to a satellite communications system that fails two years into a stellar journey is not practical. An object of the invention, therefore, is to provide a digital transmission system and, more particularly, an modulator/demodulator for such a system that is of greater long term reliability than other systems employing a phased-locked loop oscillator.

With a modulator/demodulator of greater reliability suitable for space application, a necessary fall-out of that application is that the same circuits may be used in a business and industrial application to enhance the reliability in those applications as well and minimize the need for the repair technician.

To that same end, the initial cost of an improved modulator demodulator, constructed according to the disclosed specification, must be cost competitive initially, with those prior systems containing a phase-locked loop oscillator. To that end an entirely digital circuit, as may be implemented on a single chip of semiconductor material, by large scale integration, LSI, techniques, offers a ready low cost solution. Once the initial costs of chip design are amortized, the continued production of additional copies of chips results in a lower per unit manufacturing cost. Accordingly, a further object of the invention is to provide a design for an modulator/demodulator that can be implemented on a single semiconductor chip as the preferred form.

As has long been known, Gallium Arsenide based semiconductor devices are capable of operating at greater speeds than semiconductor chips fabricated using Silicon technology. While the silicon technology is wide-spread, in part because of lower manufacturing costs and acceptable performance, the Gallium Arsenide technology, which has not received as wide use, is, at present, more expensive. The Gallium Arsenide technology may be said to have been limited in application to the very high speed devices, where the silicon technology is unsatisfactory in performance. At digital data transmission rates of 125 million cycles per second and consequent clocking rates of 500 MHz the Gallium Arsenide is preferred. Accordingly, an additional object of the invention is to provide a design for a high speed digital modulator/demodulator that may be implemented on a Gallium Arsenide semiconductor chip.

Silicon semiconductor technology need not be neglected. Although the high speeds desired as an object are perceived as requiring implementation in Gallium Arsenide materials, it is also possible to provide an modulator/demodulator circuit design that can be operated at lower speeds and be implemented in a silicon semiconductor chip. Accordingly, a still additional object of the invention is to provide a design for an modulator decoder that is entirely digital in operation that may be implemented in either of the two semiconductor technologies. By providing for operation at lower clock speeds, the circuit as implemented on a silicon-type chip should perform satisfactorily.

Modulator/demodulator circuits convert a serial stream of data into a parallel data stream, such as a five bit parallel code, which is output to succeeding circuits associated with the receiving station. The demodulator must, thus, interface with other equipment. An additional object of the invention, therefore, is to provide an improved modulator/demodulator for use in a media access control structure suitable for the high speed FDDI Token Ring Network. In that application the output signals must be predictable and reliable. An ancillary object of the invention is to provide a modulator circuit that is capable of outputting a data stream at a relatively constant rate.

SUMMARY OF THE INVENTION

In accordance with the foregoing objects and advantages, an entirely digital demodulator/modulator circuit suitable for use within a media access controller in a token ring network demodulates and modulates data information for serial data transmission. The demodulator portion receives digital information in a serial data stream, suitably of five bit words or symbols. The demodulator samples the incoming data stream at a rate of 500 MCPS, a rate four times greater than the serial transmission rate, and determines whether four consecutive samples of the data stream represents a logical "zero" or "one", and the boundary, or edge, of the data bits. To do so, each sample is copied into a serial shift register, which shifts the bits there through under control of the clock at a rate corresponding to at least four times greater than the serial data transmission rate, the latter of which is 125 MCPS typically and, hence, the clock is at 500 MCPS. Additional means within the demodulator circuit inspects the serial data stream temporarily stored in the shift register and determines whether a group of bits, for example, a group of five encoded bits or four un-encoded bits, constitutes a symbol. Once the symbol boundary is determined, the corresponding symbol is then produced with the "recovered" clock pulse.

Suitably, the modulator portion of the circuit receives parallel symbol information, suitably in five bit parallel format, during each clock cycle at a rate of 25 MCPS, shifts the information serially at each clock cycle of 125 MCPS and inverts the output logic state of the modulator output for each logical "one" present at the output of the serial register.

In accordance with a more specific aspect to the invention, the demodulator contains an internal buffer that accumulates the congregate rate difference between the demodulator clock, the local clock, and the modulator's clock to produce a constant rate of symbol signal transmission. The demodulator is suitably formed on a semiconductor chip as a monolithic assembly; the modulator is incorporated on the chip as well.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

Figure 1:
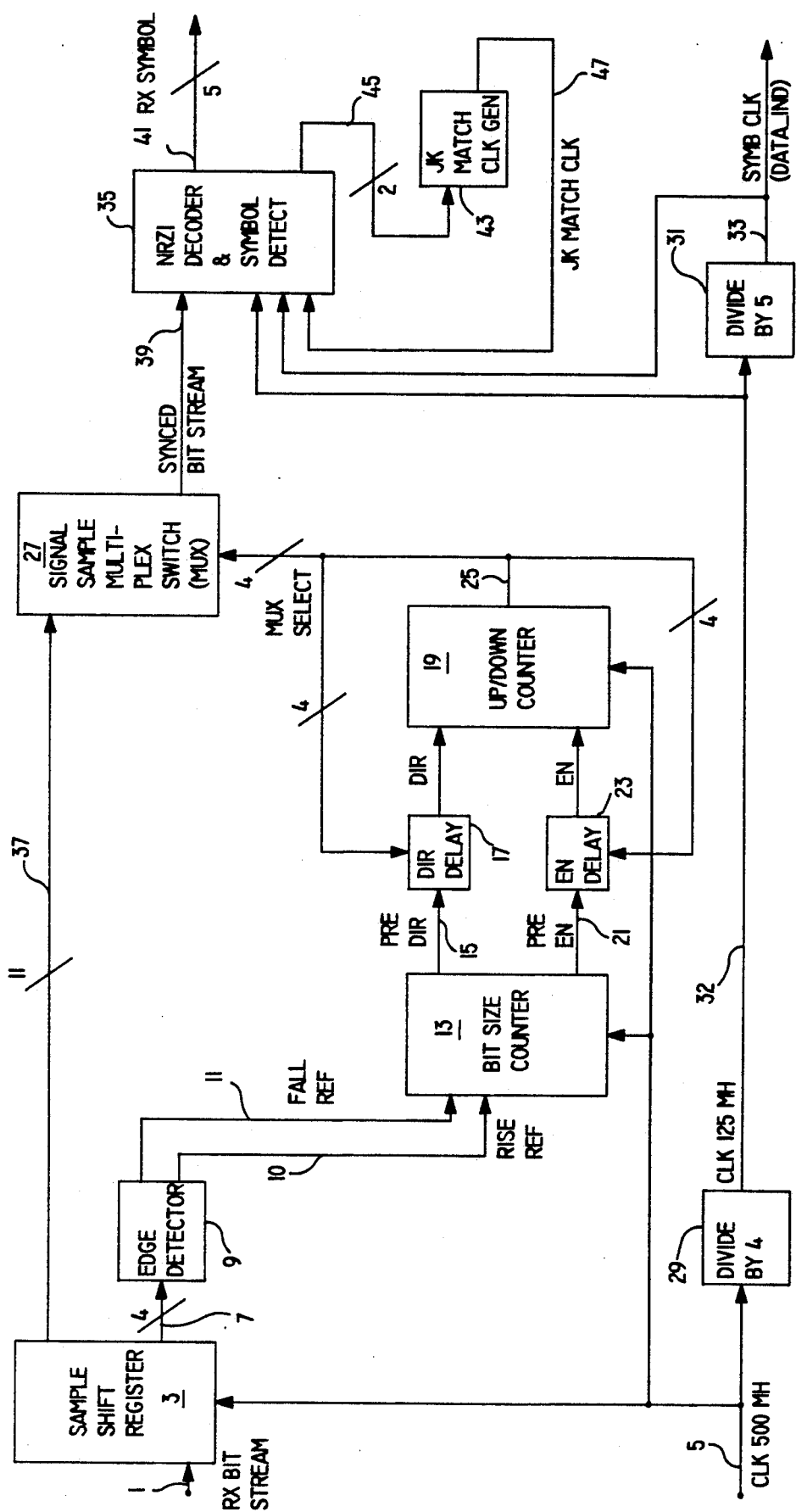
FIG. 1 is a functional block diagram illustrating the novel demodulator.
Figure 2:
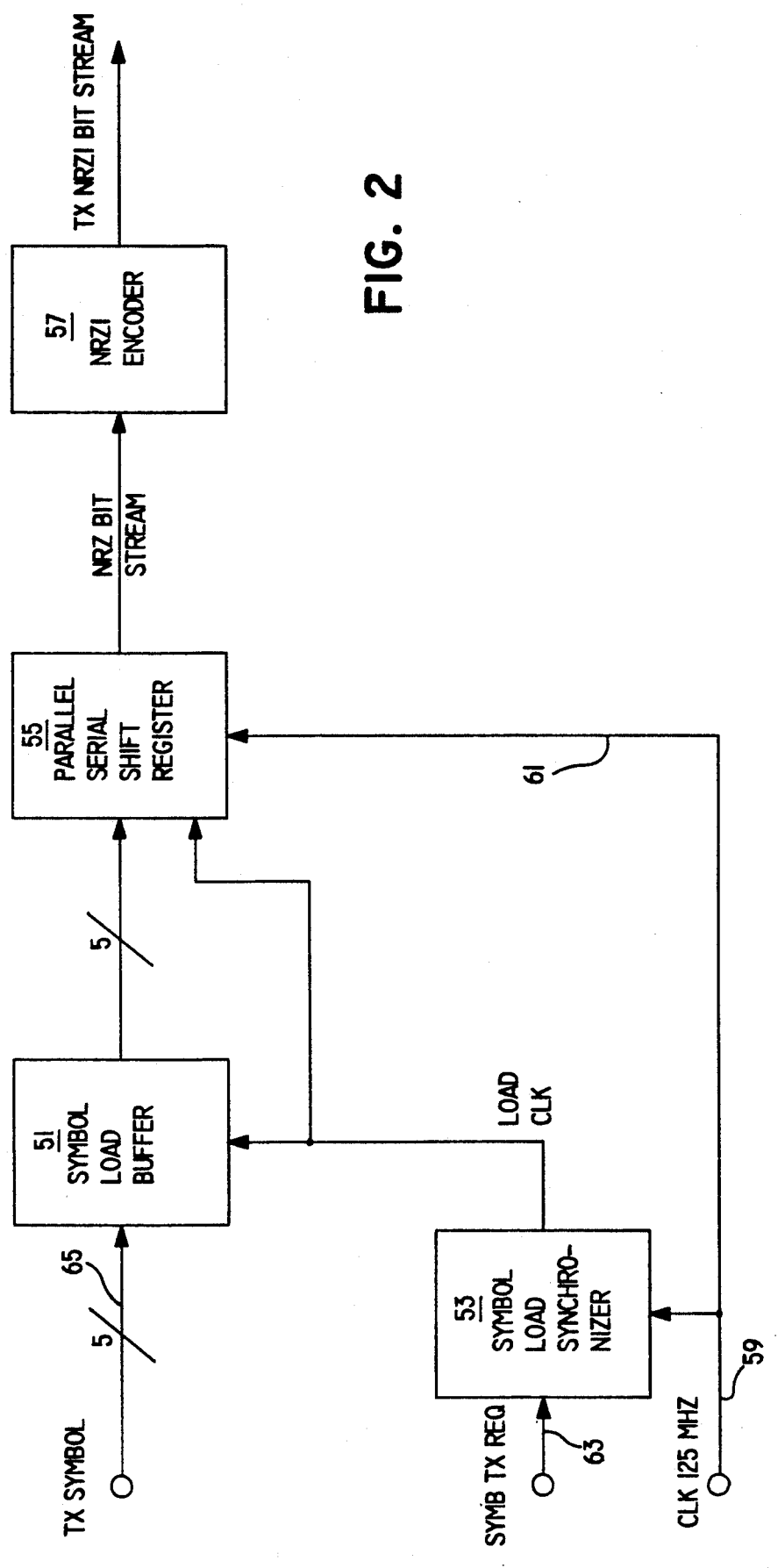
FIG. 2 illustrates the associated modulator in block diagram form.

A preferred embodiment of modulator/demodulator is illustrated in block diagram form in two parts with the demodulator being presented in FIG. 1 and the modulator portion being presented in FIG. 2. These portions are described separately. As represented in FIG. 1 a digital data stream is input at 1 to sample shift register 3 under control of demodulator clock 5. The input is in the form of an electrical signal as may have been converted from the optical signal form as used in one system employing the demodulator with the stream being in serial form transmitted at a predefined transmission rate. As example the data stream is formed of digital bits, voltage highs and voltage lows, of a predetermined or standard bit width or length, as variously termed, transmitted at a 125 MHz rate with five consecutive bits representing a five bit digital word or symbol and with a symbol or groups of symbols representing a "message". Clock 5 supplies clock pulses at a rate that is at least four times greater than the transmission rate of the incoming data stream; a clock rate, for example, 500 MHz as compared to 125 MHz for the data stream. The shift register, thus, clocked at the 500 MHz rate, inputs approximately four "slices" or samples of the digital data signal input at "1" into the initial stages of the shift register during a momentary time period comparable to the duration of a single voltage high or voltage low digital bit in the input data stream. The digital voltage high or low condition of each of those four initial samples is read out in parallel, suitably as a four bit word, from initial stages of the shift register via data bus 7 and those samples are applied to edge detector 9. The edge detector examines the samples and determines whether or not a transition has occurred between adjacent samples, between adjacent a transition between a voltage high or voltage low and vice-versa in adjacent samples, as represents the existence of a pulse "edge" of the inputted digital bits of the data stream.

With each falling edge, an output is supplied at 11, which is input into bit size counter 13; alternatively, if the detection is a rising edge, edge detector 9 outputs a corresponding pulse via 10 to bit size counter 13. The bit size counter determines whether or not the spacing between the two detected pulse edges is too narrow or too wide, representing a non-uniformity that in the preferred form of the invention is to be corrected so that the pulse width of the pulses outputted by the demodulator confirms to a standard width; are "just right".

The bit size counter has two outputs, one representing a direction, DIR, and the other representing an enable signal, EN. Through digital voltages presented at those respective outputs, the bit size counter, via the respective delay circuits 17 and 23, commands up/-down 19 with the intelligence so deciphered concerning the received bit's width.

Up/down counter 19, in response to the information from the bit size counter, outputs a four bit code, via data channel 25, to the input of a sample multiplex selector switch 27. Additionally, that four bit coded output is supplied also to an input of each of the delay circuits 17 and 23, which contain elements that decode the four bit code, signifying, either up or down, and change the output of the associated delay circuit and, hence the input to the up/down counter 19, accordingly. This feedback to the delay circuits stabilizes counter 19 and prevents it from causing intermittent outputs, before new information is inserted in succeeding cycles of operation. This form of feedback to the counter inputs, effectively, isolates succeeding events on data channels 15 and 21 momentarily from influencing the up/down counter.

Reference is again made to clock 5. The clock signal is applied, not only to the clock input of shift register 3 but to like clock inputs on each of counters 13 and 19. Moreover, the clock signal is also output to a "divide-by-four" divider 29, which divides the clock signal by four, to produce a 125 MHz rate clock pulse output at 32. That 125 MHz signal is applied in turn to an additional divider circuit, 31, sometimes referred to as the dataclock, the latter of which divides the input by five. Divider 31 derives at its output 33, thus, a 25 MHz clock pulse, which is applied to an appropriate clock input of the NRZI decoder and symbol detector 35, later discussed. Three clocks are thus employed in the demodulator. Due to the common origin of the clock pulses, the outputs from each clock are in phased relationship.

It is appreciated that during the time in which up/-down counter 19 sets up as described, clock 5 continues to clock or advance the data bits or "samples" subsequently taken at input 1 into shift register 3. The initial four samples introduced into the initial stages of the register thus advance into the register's secondary stages and new samples are received within the initial stages. As illustrated, the eleven stages in the final section of shift register 3 are output in parallel form, as indicated by the back slash and the adjacent number 11, via data path 37 to the data input of sample multiplex switch 27, where the samples are coupled to corresponding parallel inputs. A selector within the multiplex selector selects one of the inputs to couple through to the output, a process that is described hereafter in greater detail, when the specifics of that element are considered. The eleven bits of sample information thus present at the input of multiplexer 27 is, with some adjustment hereafter described, clocked-out serially as a digital bit stream and are applied, via data path 39, to the input of NRZI decoder and symbol detector 35.

Multiplex switch 27 possesses the capability of altering or changing the sequence in which the eleven bit samples, which are presented at its input, may be serially applied to output 39. As the samples are effectively "paraded" through the stages of shift register 3 in synchronism with the 500 MHz clock the multiplex switch reads out each sample as it is received and momentarily pauses at the selected multiplex switch input. A serial digital data stream of highs and/or lows at output 39 thus is produced, representing the corresponding input samples. The point at which this output is selected may be adjusted. As groups of such samples represent a digital bit, for example, four "high" samples in a row, increasing or decreasing that number results in a change in effective digital bit length or width of the digital bit represented thereby. The circuits through up/down counter 19 determines whether or not the detected edges that identify the "sides" of a pulse or bit, the pulse width, are too close together, too far apart, or just right. In the case the bit's edges were determined at bit size counter 13 to be too close together the intelligence applied through to the code input of multiplex selector 27, causes an internal selection process to occur that results in the addition of a space so as to result in the read out of a temporarily stored sample representative of a pulse edge at a slightly later time. The opposite effect occurs in the case in which the pulse edges were determined to be too far apart; the pulse is effectively shortened during the serial form output from multiplex selector 27. Thus, a properly sized pulse, one of proper duration, is presented in the serial sample data stream at 39 that properly represents the pulse duration of the corresponding digital bit of the serial data stream originally input to the demodulator at input 1 or, if the original input was deformed, a pulse of corrected width. The exact mechanics of this process is later described herein in greater detail in connection with FIG. 12.

NRZI decoder and symbol detector 35 transmits outputs at 41, which is a five bit parallel code as indicated in the figure, doing so at a transmission rate, 25 MHz as example, that is one fifth that of the rate of the data stream inputted originally at 1. The detector transmits outputs initially that are of an arbitrary symbol boundary until the circuit detects from within the input data stream at 39 the existence of two pre-defined symbols specified by the ANSI Standard as representing the commencement of a message, suitably the symbols J and K in that sequence. Initially, thus, the data representative of detected symbols is output from decoder/detector 35 as a two bit parallel code along data bus 45 to the input of the J/K match and clock generator circuit 43. As suggested by the name, the J/K match and clock generator serves two purposes: first, to determine the existence of a match and, secondly, to provide a clock signal, a fourth, derived from those symbols via output 47 to the corresponding input of NRZI decoder 35. With appropriate 125 MHz clock signals via lead 32, a 25 MHz signal via lead 33, and the J/K match signal via lead 47, the decoder and symbol detector 35 sends the parallel five bit code at output 41 Thus, a five bit parallel word data stream, operating at 25 MHz, is produced, essentially replicating in parallel form the data stream earlier input at 1.

To function properly, Clock 29 operates at a frequency, 125 MHz, that is essentially the same as that of the clock responsible for creating the data stream input to the demodulator, appropriately being no more than 0.1% different in frequency.

Reference is now made to FIG. 2, which functionally describes the modulator portion of the circuit. The modulator includes a symbol load buffer 51, a symbol load synchronizer 53, a parallel to serial shift register 55, and an NRZI encoder 57. A clock 59, which suitably may be the same clock used in the demodulator portion of the unit, supplies input via clock bus 61 to each of load synchronizer 53 and shift register 55. The synchronizer also includes a TX REQ input 63 which receives the command to transmit or shift the input information, a symbol transmit request. This input may be though of as the symbol clock supplied at Divider 31 in FIG. 1 at output 33. Importantly, the 125 MHz clock input at 59 is in phase with the symbol clock signal at 63 as both are derived from the same clock signal source, suitably the output of Divider 29 of FIG. 1.

The TX symbol input at 65 comprises a data stream in the form of five bit parallel digital words that is outputted by other equipment, not illustrated, associated with, for example, a Media Access Controller, or "MAC", of the FDDI system with which the modulator/demodulator circuit may be employed. This parallel information is loaded into the symbol load buffer. The buffer allows the digital input to stabilize momentarily to ensure that all inputs are present before that digital information is acted upon. Synchronizer 53 thus causes the buffer to pass the five bit parallel word to shift register 55. Under control of Clock 59, the digital word inputted in parallel is sequentially shifted out of the register as an NRZ type bit stream to NRZI encoder 57. The NRZI encoder then converts the NRZ bit stream into an NRZI bit stream of serial form digital data.

At this stage the function of the modulator is complete. The output is an electrical signal that is then applied to electrical to optical converts, which are of entirely conventional structure, in other equipment, not illustrated, as permits the "high" and "low" electrical signals to be transmitted as "on and off" pulses of light within a fiber optic cable when used, as example, in the FDDI fiber optic system. As those skilled in the art may deduce from the foregoing block diagrams, the modulator and demodulator circuits are essentially independent of one another and may be formed on separate semiconductor chips, if desired. Advantageously, the two circuits use the same clock source and power supplies. However, in as much as both a modulator and a demodulator are required in the operation of any station in the FDDI system, obvious economies are achieved by incorporating these circuits upon a single chip.

Figure 3:
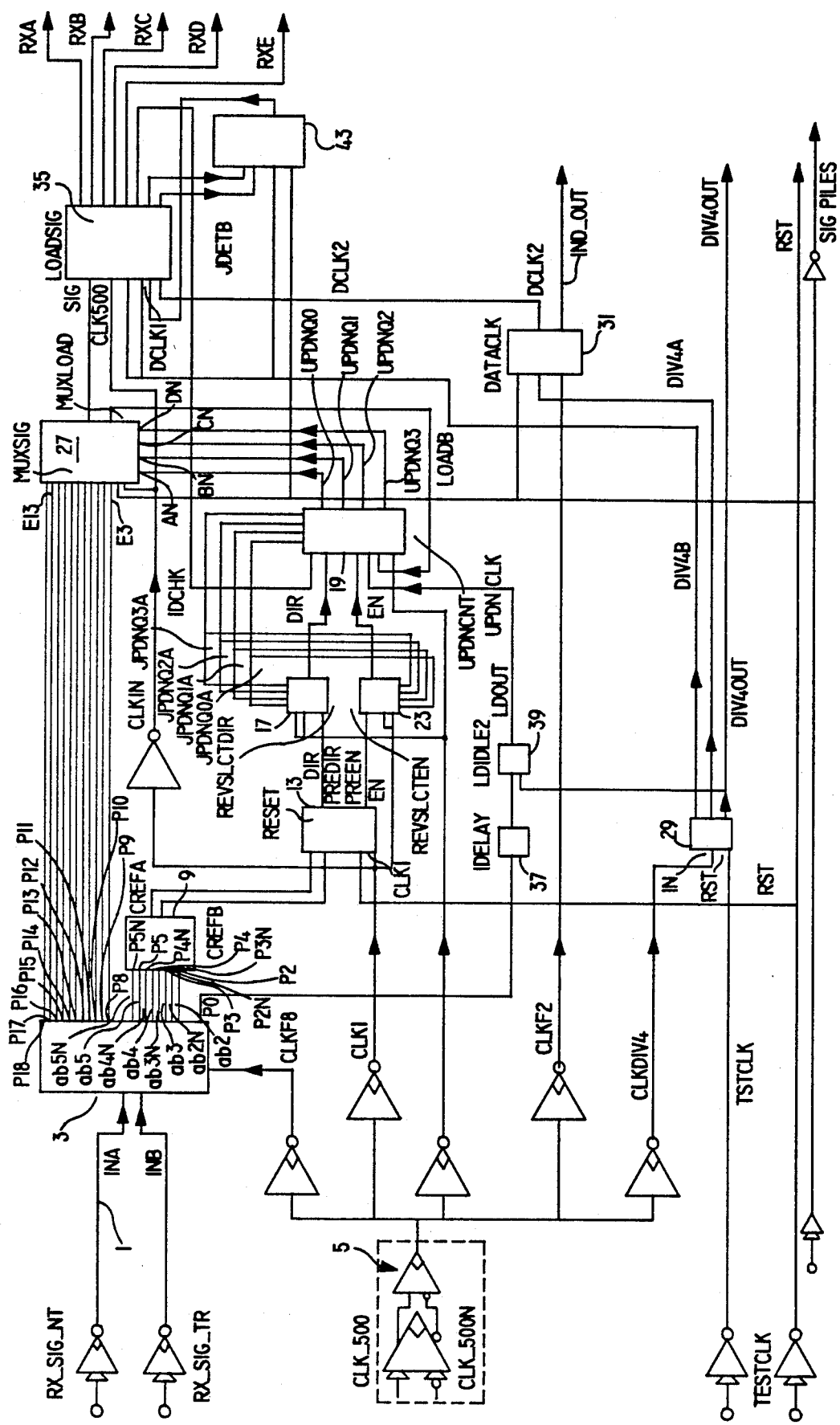
FIG. 3 illustrates the demodulator of FIG. 1 in greater detail in schematic form.
Figure 17:
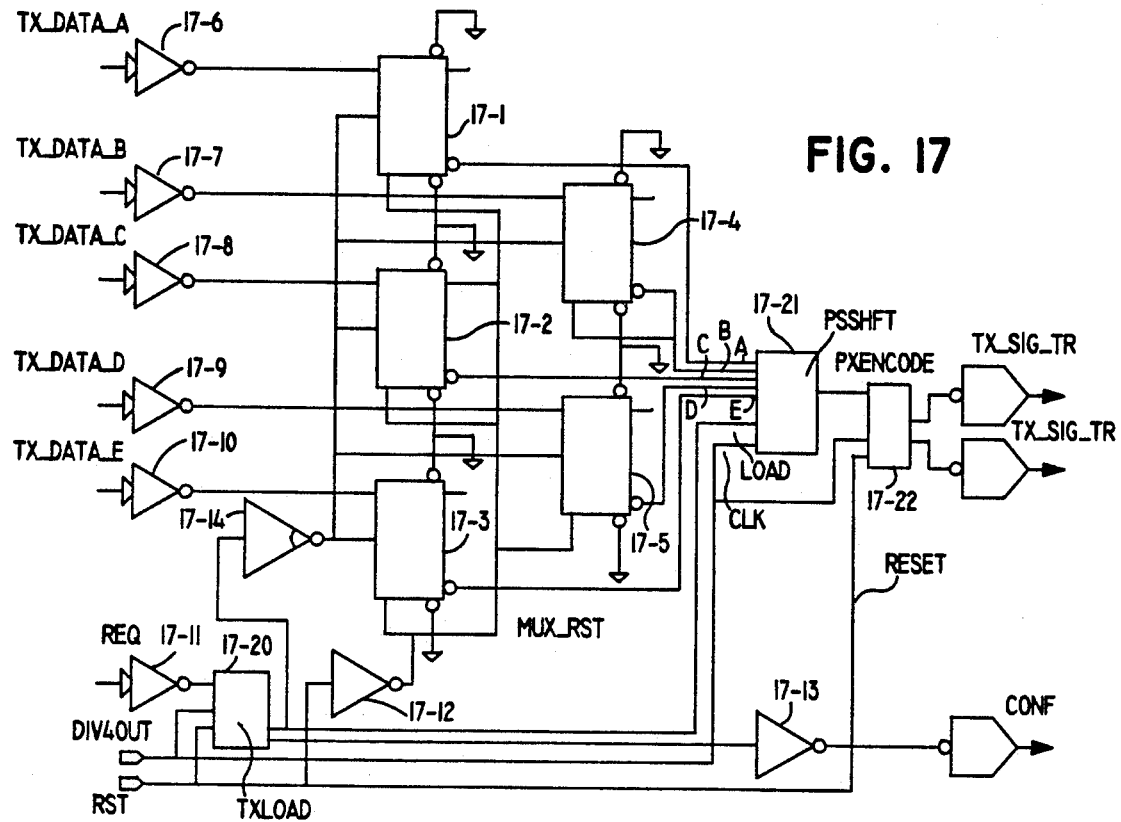
FIG. 17 is a more detailed schematic diagram of the modulator circuit previously illustrated in the block diagram of FIG. 2.

With the foregoing general description the demodulator and the modulator circuits are considered in greater detail in the subsequent electrical schematic diagrams of FIGS. 3 and 17 and the associated figures of the drawings as presents the particulars of certain elements represented in block form in FIGS. 3 and 17.

The demodulator of FIG. 1 is illustrated in schematic form using conventional logic symbols to represent conventional devices in FIG. 3 to which reference is now made. For convenience, those elements earlier identified in the preceding figure are used to identify like elements in this figure. The demodulator includes shift register 3; suitably of 18 stages, clock 5; a divider circuit 29, whose output serves as a clock operating at a rate of 125 MHz; edge detector 9, multiplex selector 27; a counter 13; up and down counter 19; delay circuits 17 and 23; NRZI Decoder and Symbol Detector 35, by means of which inputted serial bit words are converted to parallel output format as represented by five output leads labeled RXA through RXE; the JK match and clock generator 43, a data clock circuit 31, also earlier referred to as a Divide-by-five circuit, and various buffer circuits, which are not labeled. As first illustrated in this schematic, the modulator includes a delay circuit 37 having an input connected to output P0 of shift register 3 and an output connected to the input of a idle symbol detector 39, which determines whether an idle signal is being received and provide appropriate signal to up/down counter 19. Various of the circuit elements described above, illustrated in block form in the schematic of FIG. 3, are presented in greater detail in the additional figures to the drawings.

The input 1 signal is of the complementary type; that is, an input signal at lead INA, which represents the digital data stream in serial form, such as the five bit serial NRZI code, is presented to shift register 3 at input INA and the complement of that signal, the mirror image, is simultaneously applied at the complementary second input, INB. A complementary signal arrangement is accomplished with a circuit, not illustrated, that transforms the original signal from the transmission line and provides complementary outputs. Though not necessary to the function of this system, that complementary signal arrangement is preferred as it provides greater reliability. For convenience, the explanation will generally be given in respect of the principal input; the complementary input is understood to function in the same manner.

The input signal is a digital signal that follows the NRZI code, previously discussed. In the serial stream of "1's" or highs and "0's" or lows, representing the digital data, there is a group of five consecutive bits that represent a symbol, according to the NRZI code. With the highs and lows selectively taken in any one of five positions of the code $2^5$ or 32 different symbols may be represented in the group of five bits. Within that number, some are used to represent letters and others may be used to represent control functions, or are simply unused. Data is represented in Hexadecimal form using 0, 1, 2, 3, 4, 5, 6, 7, 8, 9, A, B, C, D, E and F for a total of sixteen of the thirty-two available symbols, with the remainder being control symbols or invalid symbols. As one appreciates, the typical data stream of computer to computer communications contains many sequential groups of such five bit symbols as may represent a particular group of symbols forming a word or control function that are presented in serial order in a continuous stream applied to the input over the fiber optic transmission line not illustrated. As example, the symbols J and K, represented in hexadecimal code sent together signify a start of message or frame, which is used herein for control purposes. This stream of data occurs with pulses of uniform duration or and at a set rate, such as 125 MHz, under control of a clock in the equipment at the remote end where the data stream originates.

The demodulator clock 5 operates at a faster rate, at least four times greater than the rate at which the input data is sent. As is apparent, Clock 5 is independent of and not synchronized with the clock at the distant transmitting end. The data arriving at lead INA is read into the shift register 3 under control of clock 5. Since clock 5 is operating at a rate four times greater than that of the input signal, clock 5 effectively allows shift register 3 to sample the input signal four times within a time interval equal to the duration of a single digital bit of the input signal, thereby serving as a sampling circuit. Those samples are "read" or inputted in sequence into the first section of shift register 3 in serial order. After an interval of time those samples appear on the register's output leads AB2, AB3, AB4, and AB5. It is noted that as the clock continues to advance to later stages within the shift register 3 and additional signals appear at the shift register input, the above described samples are advanced into and through the second stage of the shift register with the outputs representing those samples appearing at register output leads P8 through P18. The foregoing electronic action is essentially a continuous process.

Edge Detector Circuit 9 looks to the samples of the input bit as presented from register output leads AB2 through AB5 presented at inputs P2 through P5N and determines whether any adjacent samples signify the existence of a pulse edge, that is the detection of a transition between a voltage high to a low, or vice versa. If the one sample is determined to be a voltage high and the next succeeding sample a voltage low, then a transition from high to low represents a pulse edge. Conversely, if one pulse sample is low and the next a high, a transition is also represented. A more detailed illustration of the Edge Detector is presented in FIG. 5, discussed later in greater detail.

The output of Edge Detector Circuit 9 is supplied to the input of bit size counter 13. That counter is also under control of clock 5, the latter of which provides synchronizing pulses to the counter, as represented by the lead to the CLK1 input of the counter. At its output counter 13 provides a count that represents the space between adjacent pulse edges, hence the duration or width of the pulse. Thus, for example, if pulse edges are detected within four occurrences of the clock pulses supplied by clock 5, the pulse width of the sample is the same of that of the input signal; it is thus a "correct" length or standard width signal, effectively one occurring at a 125 MHz rate. On the other hand, if the counter counts only three pulses from the 500 MHz clock between the two detected pulse edges, then the sample pulse is effectively too narrow, and its width must be corrected, lengthened by this circuit. A more detailed illustration of counter 13 is presented in FIG. 6, which is later discussed.

The output from counter 13 at output PRE-DIR is fed via delay circuit 17 to the DIR input of up/down counter 19. A second output EN from counter 13 is fed via delay circuit 23 to the EN input of that up/down counter. Counter 13 is a state machine that provides combinations of outputs at PRE-DIR and PRE-EN that defines a prescribed code. Up/down counter 19 is essentially a state machine that provides an output that is dependant upon voltage highs and lows applied at its inputs. By design the up/down counter provides an output code, representing a mid-range count that indicates a proper length pulse, a normal pulse. When improper length pulses are detected, that output changes. A more detailed illustration of counter 19 is presented in FIG. 9, which is later discussed.

Bypassing for the moment the purpose and function of delay circuits 17 and 23, up/down counter 19, under control of the 500 MHz clock, 5, provides an appropriate output at its four outputs UPQ0 through UPQ3 in the form of a four-bit digital code, representing the code for making any necessary correction. Concurrently, a second set of code outputs JP0A through JP3A is inputted into the delay circuits 17 and 23. Delay circuits 17 and 23 respond accordingly, making necessary corrective action to the inputs of the up/down counter to effectively stabilize counter 19 until the next clock input. Outputs UPQ0 through UPQ3 are applied to corresponding inputs of the multiplex selector circuit 27, which serves as a selector as earlier described in connection with FIG. 1. While the foregoing electronic operation is carried out, additional clock pulses are fed via clock 5 into shift register 3, which advances the samples contained in the register's first section, as were examined electronically in the operation, earlier described, and advances those samples into positions output at P8 through P18, while simultaneously reading in, or sampling, portions of the next input pulse at register inputs INA and INB. It is recalled that the circuit function and the input signals are changing rapidly. Events occurring in a brief time interval are being described.

The parallel outputs at P8 through P18 of shift register 3 are coupled, via the leads illustrated, to the corresponding inputs E3 through E13 of sample multiplex selector 27, effectively "cloning" or copying the samples appearing in the later stages of shift register 3 at the input of the multiplex selector. Multiplex Selector 27 receives the samples in parallel at its inputs and reads out the samples serially to the next portion of the demodulator, namely, NRZ2 demodulator 35. In so doing, the internal circuitry of the multiplex selector is such as to permit the order in which the input samples are read out to be changed, that is advanced or delayed, depending upon the code supplied to its inputs AN, BN, CN and DN by up/down counter 19. This built-in intelligence or logic effectively results in adjusting the received pulse's duration to more accurately characterize a proper electronic pulse. A more detailed illustration of the multiplex selector is presented in FIG. 12 discussed later in this specification.

Multiplex Selector 27 outputs an NRZI type signal to an input of NRZI demodulator and symbol detector 35, which is under control of the 125 MHz clock signal outputted by "divide by 4" circuit 29 in the lower section of the figure. Detector 35 functions with the JK Match Clock Generator 43 to output a digital signal in parallel form at leads RXA through RXE. This detector circuit is also described in greater detail hereinafter.

Data clock circuit 31 contains several inputs, including one from the 500 MHz clock and a second from divider 29. Data clock provides a continuous 25 MHz signal that is used to indicate when a valid symbol is present on RX_DATA_(A:E).

Figure 4:
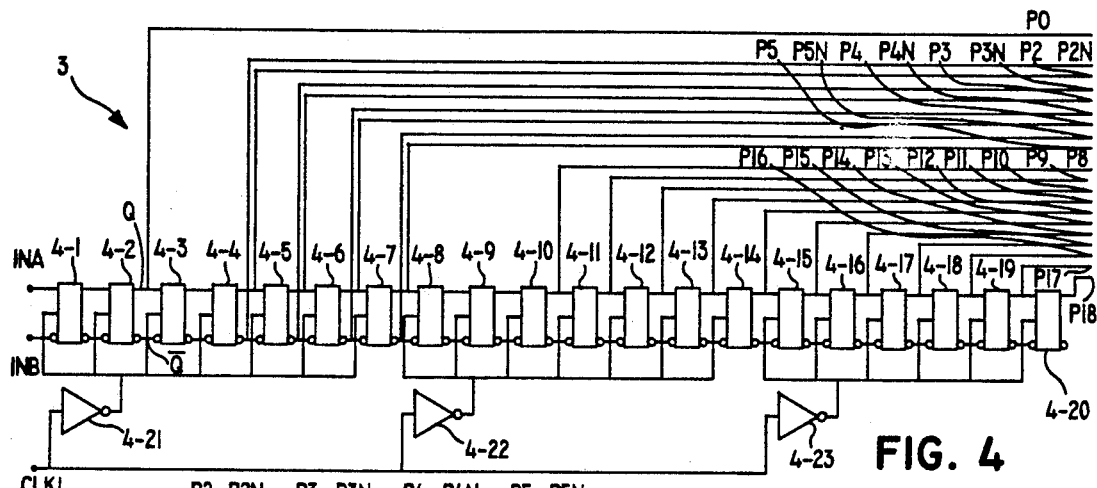
FIG. 4 illustrates schematically a shift register element generally referenced in FIG. 3.

The sampling shift register 3 of FIG. 3 is detailed in schematic form in FIG. 4 to which reference may be made. The shift register contains twenty D-type clocked flip-flops, 4-1 through 4-20, three invertor buffers, 4-21, 4-22 and 4-23, inputs INA, INB and CLK1, and outputs P0-P5, P2N-P5N, and P8-P18. The 500 MHz clock signal, input at CLK1, is buffered via the three buffers and applied to the respective clock inputs of the individual flip-flops in the register. Inputs INA and INB represent the incoming digital signal and its complement, respectively. The P0 output is coupled to the second stage at the Q output of 4-2, with the stages being counted from left to right in the figure. The P2 and P2N outputs are connected to complementary outputs of the fourth stage; the P3 and P3N the fifth; the P4 and P4N the sixth; and the P5 and P5N the seventh stage. The former outputs represent the initial stage of the shift register as earlier characterized. Outputs P8 through P18 represent the output of the last eleven stages, the "second stage" of the shift register.

It is recognized that with an input at INA the clock signal at CLK1 causes the first flip-flop to detect that high, representing binary 1, and/or low voltage, representing binary zero, as appropriate, and with the flip flop "latching" to the respective electronic state. As the clock supplies clock pulses at a rate five times greater than the rate of change in the input pulses presented at INA and INB, samplings are taken and applied to the first stage of the shift register, represented by flip flop 4-1. This reading is shifted to the next succeeding stage, flip flop 4-2, with the appearance of the next clock pulse and the first stage obtains any new reading. This process continues with succeeding clock pulses. Individual samples entered into the register thus progress down the various stages of the register's flip flops until all twenty stages are filled. Thereafter, each succeeding sample, at the front or left end of the shift register shown in the figure, results in deleting the information contained at the extreme right end of the shift register, flip flops 4-20, as is entirely conventional operation.

A high level output at P0 occurs each time the input signal sample entered into flip-flop 4-2 represents a high. In like manner, the outputs at P2, P3, P4 and P5 and P2N through P5N will change accordingly to replicate the high or low condition of the sample in the respective stage of the register. As earlier discussed in the operation of the circuit overall in FIGS. 1 and 3, subsequent portions of the circuit determine whether or not any change from a high to a low or vice-versa, appears between outputs P2 through P5 while P0 signifies entry of information within the register to associated circuits. That information is used subsequently as the same digital information is passed through into the later stages of the shift register for parallel read out.

Figure 5:
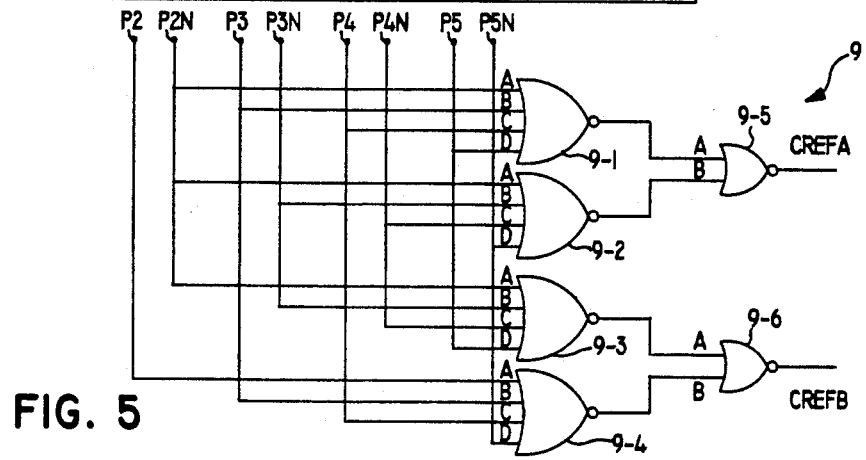
FIG. 5 illustrates schematically the edge detector element generally indicated in FIG. 3.

At this juncture in the specification one first considers the details of those elements responsible for the detection of and adjustment of the pulse width represented by the samples. Edge Detector 9, depicted in more detailed form in FIG. 5, is formed of four quad input NOR gates, 9-1, 9-2, 9-3, and 9-4, and two dual input NOR gates 9-5 and 9-6. The circuit receives eight inputs at P2 through P5 and P2N through P5N, representing the samples and their complementary and provides corresponding outputs at CREFA and CREFB with appropriate digital ones and zeros representing digital highs and lows, respectively, on the outputs. The output of the circuit determines whether or not the four slices or samples obtained from shift register 3 contains a pulse edge; that is, detects a transition from a digital high to a low or vice-versa as signifies an edge to a digital bit represented in such samples. The detector circuit maintains that output, notwithstanding subsequent changes at its inputs, changing only when the next oppositely directed pulse edge is detected. When the inputs P5, P4, and P3 are low, for example, and that at P2 is high, a series of samples representing a transition or edge to a high, an active low output is provided at CREFA. Likewise, when P3, P4, and P5 are high and P2 is low, an active low output is provided at CREFA.

Nominally CREFB always goes to low 2, 4, 6, 8, 10 or 12 cycles after CREFA was an active low. The exact output of the circuit at CREFA and CREFB are characterized by the logic equations:

$$\overline{CREFA} = \overline{P2}\,\overline{P3}\,\overline{P4}\,\overline{P5} + \overline{P2}\,P3\,P4\,P5 \quad (1)$$

$$CREFB = \overline{P2}\,\overline{P3}\,\overline{P4}\,P5 + P2\,P3\,P4\,\overline{P5} \quad (2)$$

The edge detector's outputs described are illustrated hereafter in FIG. 6C, which is later considered in connection with another of the circuit elements. As is noted in the overall operation of the demodulator the described function is accomplished by the edge detector approximately every two nanoseconds at the rate of the 500 MHz clock as the outputs from shift register 3 change, changing the inputs accordingly.

Figure 6A:
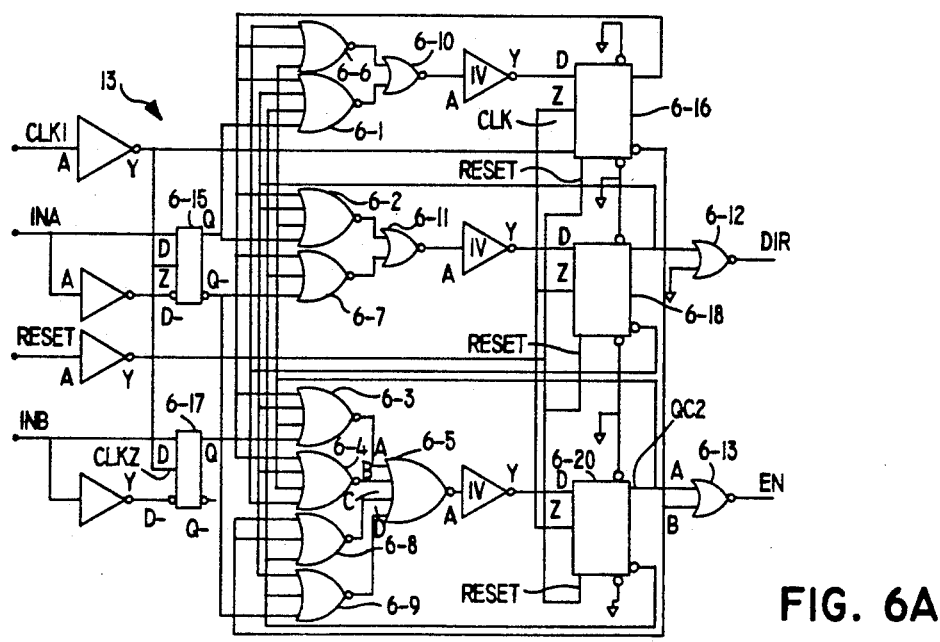
FIG. 6A represents the bit counter element of FIG. 3 in electrical schematic form and FIGS. 6B and 6C(1)–6C(3) illustrate a state diagram and output wave forms, respectively, detailing operational characteristics for that element.

Bit size Counter 13 is presented in greater detail in FIG. 6a. The counter incorporates five quad-input NOR gates identified as 6-1 through 6-5; three triple input NOR gates identified as 6-6 through 6-9 and four dual input NOR gates identified as 6-10 through 6-13 in the figure. At the left side, or input end, the circuit includes two flip-flops identified as 6-15 and 6-17 and on the right hand side of the figure contains three additional flip-flops that are of the D reset type, designated 6-16, 6-18, and 6-20. As shown, the output of the NOR gates 6-10, 6-11 and 6-5 are connected by respective invertor circuits identified as IV to the D input of a respective one of the re-setable D type flip-flops 6-16, 6-18 and 6-20, respectively. As those skilled in the art recognize counter 13 is a state machine that provides at its outputs DIR, representing direction, and EN, representing enable, an indication of "move up one" or "move down one" or "make no change whatsoever" to thereby signal the succeeding circuits accordingly as was described in FIG. 1.

Input RESET represents the signal used to initialize the counter upon start-up. As shown, the reset signal is coupled to the reset inputs of flip-flops 6-16, 6-18, and 6-20. The input at clock CLK1 are the clock pulses supplied by demodulator clock 5 earlier described, which provides pulses at a rate of 500 MHz, essentially every two nano-seconds with the clock being coupled through an invertor buffer, as illustrated, to each of the flip-flops. Inputs INA and INB represent the edge detect signals derived from the preceding portion of the circuits, namely edge detector 9. Depending upon when the inputs are received at INA or INB and, accordingly, the state of the associated flip-flops 6-15 and 6-17, the circuit effectively counts spaces between edges of a pulse. The associated state diagram presented in FIG. 6b represents the combination of outputs as occurs against the combination of inputs in this digital "state machine".

The operation of counter 13 is better defined by consideration of Chart I, presented at the end of this specification. The chart describes the counters output states as a function of the inputs thereto and the state in which the flip-flops, comprising the final stages of the counter, are disposed at the time of the designated inputs at INA and INB. The Boolean Logic equations, which characterize the state of edge detector 9 outputs, CREFA and CREFB, are also given in Chart I. The chart is accompanied by the state equations characterizing counter 13. These equations are presented in conventional Boolean Logic, understood by those skilled in the art. The bar over the letter represents the low, or zero state, the plus represents a logical "or" condition, and the adjacency of letters in the equation represents an "and" condition. Chart I may be considered together with the counter's state diagram presented in FIG. 6b and the input/output sample waveforms presented in FIGS. 6C(1), 6C(2), and 6C(3).

In Chart I the columns under the heading "Present State" represents the output state of the flip-flops in FIG. 6a identified as 6-16, A; 6-18, B; 6-20, C; respectively and may be either zero, representing a voltage low, or 1, a voltage high. Similarly, under the next column labeled "Inputs" the two inputs INA.b and INB.d are represented. It is noted that the lower case letter d represents that the input to the counter at input INA is delayed by one clock cycle; likewise the same is true for the input at INB. That delay was introduced at flip-flop 6-15 and flip-flop 6-16. Under the two columns the state is represented either as either zero, one, or the Greek letter $\phi$. The one and the zero have the same meaning as before. The Greek letter $\phi$ represents that the input may be either a one or a zero; the output level is of no consequence, the circuit does not react or "care". Under the column labeled "Next State" the new output state of flip-flops 6-16, 6-18, and 6-20 are again represented. Lastly, under the column labeled "Outputs", the output at DIR and the output at output EN are indicated.

Thus, considering the present state in the first row of chart I as zero, with inputs $\phi$, 1 the output state of flip-flops 6-16, 6-18, and 6-20, respectively A, B, and C, remain at zero, zero, zero. The output at DIR is a one, and the output at EN is zero. Consequently, the counter cannot cause a change in the up/down counter as there is no output from the enable output EN. This condition is represented in the state diagram of FIG. 6b wherein the state of the counter is represented in the circle while the change, if any, between present inputs and succeeding inputs is represented by the arrow and the adjacent legend showing inputs and outputs. In the case just considered the counter is at state zero, zero, zero in the top of the diagram and the input is represented as $\phi1$, while the output is represented as $\phi0$. As indicated by the arrow which returns to the origin, there is no change in the state of the counter.

Considering next the fourth row of Chart I, wherein the present state of the counter is represented as zero, zero, one, with inputs zero and $\phi$ at INA.d and INB.d, respectively, the counter switches to the next state, as represented in the next column as being one, zero, zero, causing the outputs at DIR to be a voltage high, or one, and the output at EN also to be a high or one. This represents a pulse as being too short. As elsewhere discussed, the combined signals cause the succeeding stages, the up/down counter, to make a change accordingly. Again this latter state is illustrated in the state diagram of FIG. 6b as the second circle containing zero, zero, one, with the arrow leading to the lower right. Adjacent to that arrow is the input representation of zero $\phi$, as well as the output representation of one, one, indicating the transition of the counter to the one, zero, zero state.

The action that actually transpires in the circuit is represented by the signal wave forms presented in FIG. 6c, to which reference may be made. The output wave forms of edge detector 9 at output CREFA and CREFB are illustrated in the first and second wave forms in each of FIGS. 6c(1), 6c(2) and 6c(3). These also represent the wave forms input at INA and INB. The output at DIR occurs regularly when the input at CREFA is a low and the output at CREFB is a high, resulting in the wave form DIR being a "low" for the duration of the condition. However, output EN does not change; it has no output and remains "low". Thus, with a normal "idle" pattern, in which all bits of the data word sampled are of a correct duration or length, counter 13 does not cause any output signal as would change the state of the succeeding up/down counter 19, illustrated earlier in FIG. 3.

When a digit bit that is sampled and received in shift register 3 is only three samples in length, for example, representing a pulse width that is too short, the wave form representation is as presented in FIG. 6C(2). One notes that the output wave form of CREFA contains two low pulses that appear too close together than was the normal case in FIG. 6C(1), the third and fourth pulses. And a like compression in spacing occurs with the third and fourth pulses at input CREFB. This results in an output wave form representation at DIR, whereby the space between the second and third low going pulses in the waveform at DIR is much longer than the space between the first and second pulse, or the corresponding pulse spacing as in the preceding case given in FIG. 6C(1). As a result, an output occurs at EN, shown by the high going pulse. Consequently, at this point there is a one, or high output at DIR and a one, or high output, at EN for the momentary period, and the succeeding circuits respond accordingly, as elsewhere herein described.

Lastly, in the event a received digital bit or pulse is five samples in length, representing a condition where the pulse is too long or wide, the wave forms presented in FIG. 6C(3) results. As shown in this figure a portion of the wave form CREFA has a greater distance between the third and fourth "low" pulses; wave form CREFB has a greater distance between the third and fourth pulses also. The output wave form at DIR consequently results in a rather wide "low" pulse shown as the third pulse in the figure. A high going pulse occurs at output EN, which partially overlaps in time the low going pulse output at DIR. In this condition during the time interval there is thus a zero output at DIR and a high output at EN, which results in action being taken by the succeeding up/down counter elsewhere described. If, for example, three consecutive high level bits or three consecutive low level bits are input to shift register 3, either such series of bits will be represented by either eleven samples, which is one sample deficient, twelve samples, which correctly corresponds in number for four samples for each of three bits, or thirteen samples, which is one too many. Accordingly, the up-down counter reacts as previously described by effectively lengthening the last bit of the three sampled bits, maintaining the length of the last bit, or, alternatively, shortening the last bit of the three sampled bits as required.

Figure 7A:
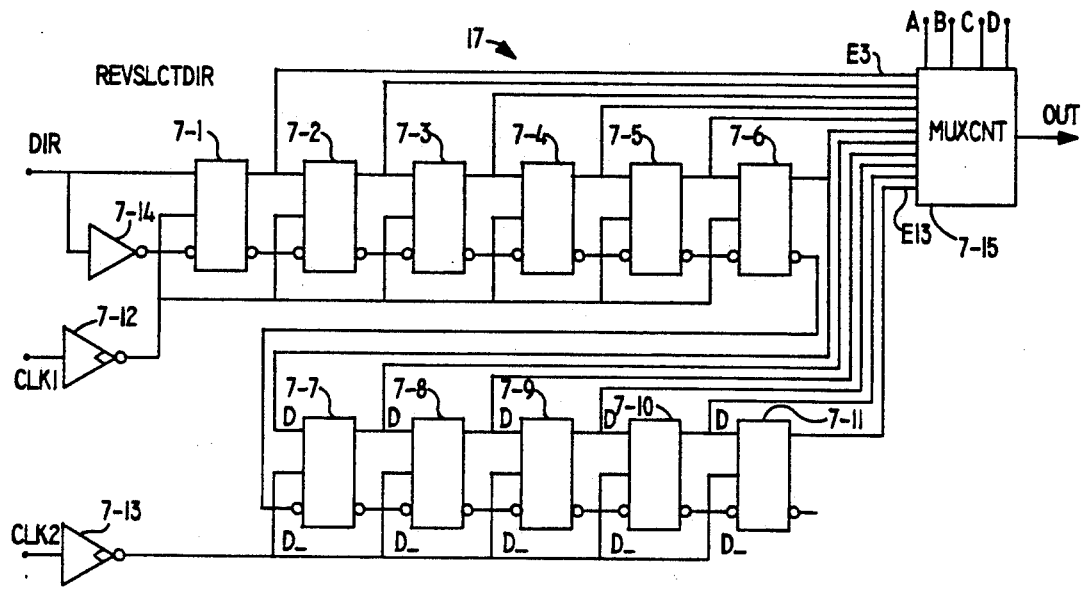
FIGS. 7A, 7B, and 8 schematically illustrate the delay circuit elements generally indicated in FIG. 3.
Figure 8:
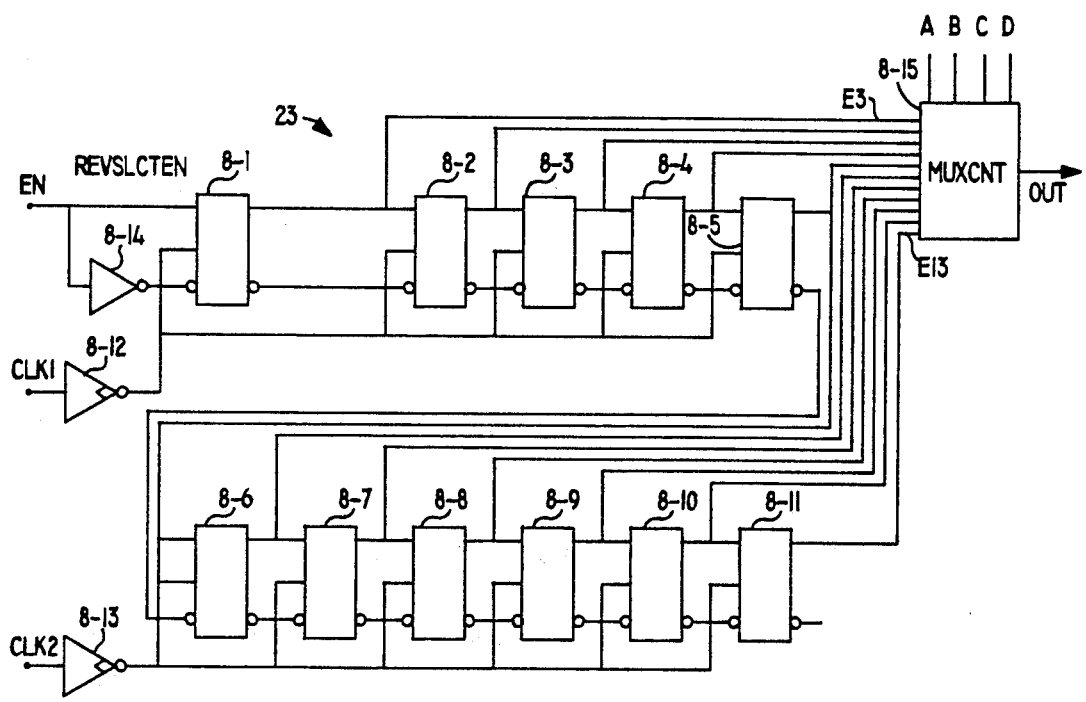
Figure 7B:
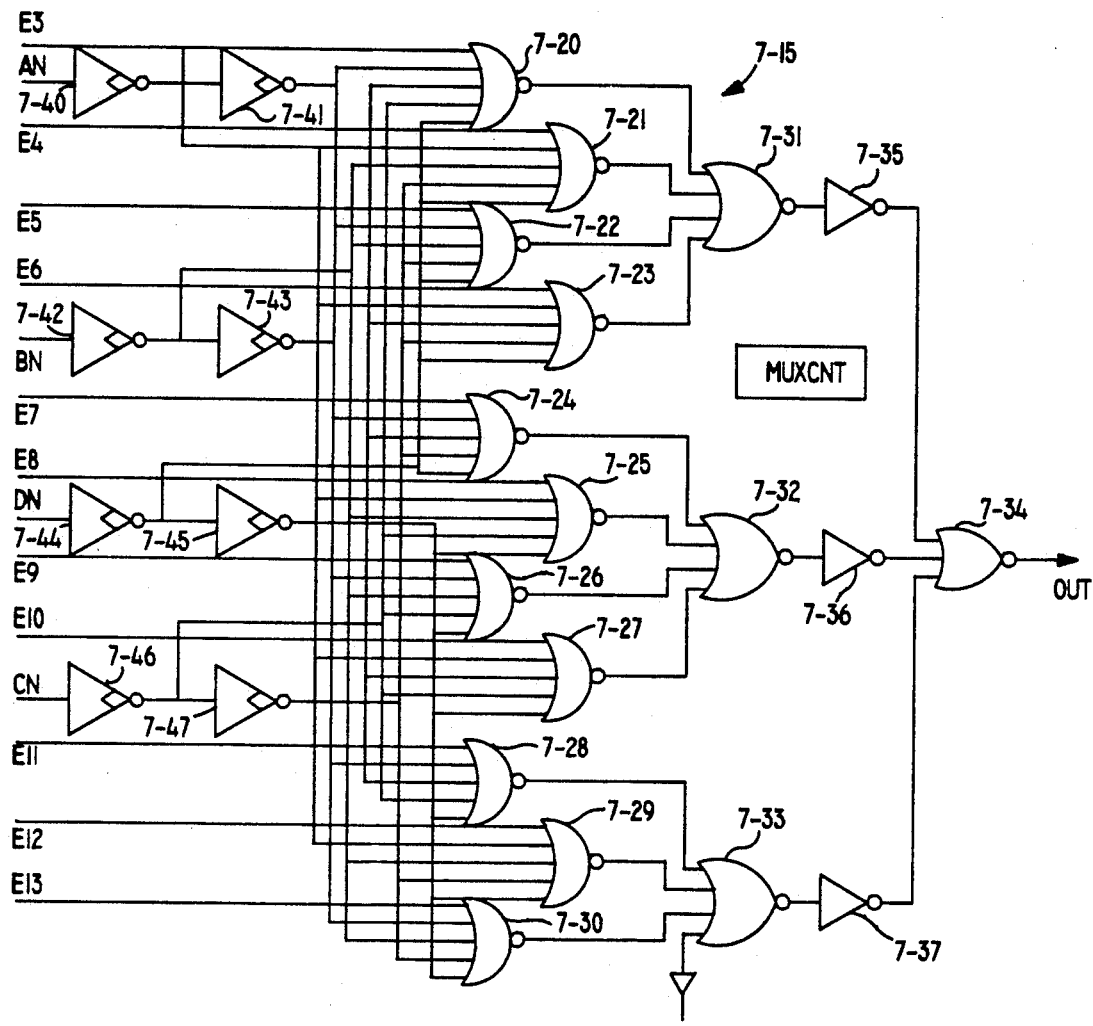

Delay Circuit 17 and Delay Circuit 23, which were located in between bit size counter 13 and up/down counter 19 in FIG. 3, are illustrated in greater detail schematically in FIGS. 7a, 7b, and 8. Comparing the schematics of FIG. 7a and 8 it is seen that the two delay circuits are virtually identical in construction. Consequently this detailed discussion may be limited to one of the two circuits, delay circuit 17. Circuit 17 includes eleven D type flip-flops, 7-1 through 7-11, two invertor buffers, 7-12 and 7-13, an invertor, 7-14, and a multiplexing selector, 7-15, symbolically illustrated, MUXCNT, the details of which are presented in FIG. 7b. As illustrated flip-flops 7-1 through 7-11 form an eleven stage shift register. Inputs CLK1 and CLK2 provide respective clock inputs of the clock 500 MHz clock signal via separate buffers 7-12 and 7-13 to the first six and final five stages, respectively, of the shift register. As earlier described the shift register in delay circuit 17 outputs eleven succeeding cycles of the digital signal DIR inputted via counter 13 as occurs over a period of 11×2 nano-seconds with the output of each stage in the register being coupled to corresponding inputs, E3 through E13, of the multiplex switch 7-15, MUXCNT. An example of the DIR waveform over four cycles was illustrated in FIG. 6c for various conditions. Control inputs A, B, C and D of multiplex switch 7-15 obtains a four bit code from the up/down counter 19, FIG. 3, that specifies or selects which of the inputs E3 through E13 is connected through to multiplex switch 7-15 output, OUT. As previously described in the description of the overall operation of the circuits the succeeding up/down counter provides a feedback and specifies at leads A through D which of the lines E3–E13 should now be outputted. Thus, following initial detection of the pulse edge position, which is processed by the subsequent portions of the circuit, a feedback to Delay Circuit 17 occurs, forcing the delay circuit to provide a new output and thereby leave the following portions of the circuit, the up/down counter, undisturbed momentarily until the entire bit size detection process is repeated in subsequent clock cycles.

The Multiplex Switch 7-15, briefly described in connection with the preceding FIG. 7a, is illustrated in greater detail in FIG. 7b, which is next considered. The circuit contains eleven five-input NOR gates, 7-20 through 7-30, three quad input NOR gates, 7-31, 7-32, and 7-33, a single triple input NOR gate, 7-34, three inverters, 7-35, 7-36 and 7-37, and eight invertor buffers, 7-40 through 7-47. The circuit functions as eleven to one multiplexer; the circuit logic provides the appropriate output at OUT, depending upon the information decoded from that applied to inputs at inputs AN, BN, CN and DN, represented earlier in the figure, to thereby admit to the output, via gate 7-34, the inverted level of one of the eleven input leads E3 through E13. A tabulation of the inputs and outputs follows:

| SELECT INPUTS | | | | SIGNAL OUTPUT |
| --- | --- | --- | --- | --- |
| DN | CN | BN | AN | OUT |
| 0 | 0 | 1 | 0 | E13 |
| 0 | 0 | 1 | 1 | E12 |
| 0 | 1 | 0 | 0 | E11 |
| 0 | 1 | 0 | 1 | E10 |
| 0 | 1 | 1 | 0 | E9 |
| 0 | 1 | 1 | 1 | E8 |
| 1 | 0 | 0 | 0 | E7 |
| 1 | 0 | 0 | 1 | E6 |
| 1 | 0 | 1 | 0 | E5 |
| 1 | 0 | 1 | 1 | E4 |
| 1 | 1 | 0 | 0 | E3 |

As is apparent, the details of and operation Delay Circuit 23, which handles the EN output of the bit size counter, as illustrated in FIG. 8 is virtually identical and performs the same operation with respect to input EN as was accomplished with the DIR input. Multiplex selector 8-15 is identical in structure to multiplex selector 7-15. Accordingly, the corresponding elements in this figure are given corresponding numbers to those elements in FIG. 7a and function in the same manner.

An example of the EN waveform over a four cycle period was presented in FIG. 6c and illustrates the input at various conditions.

Figure 9:
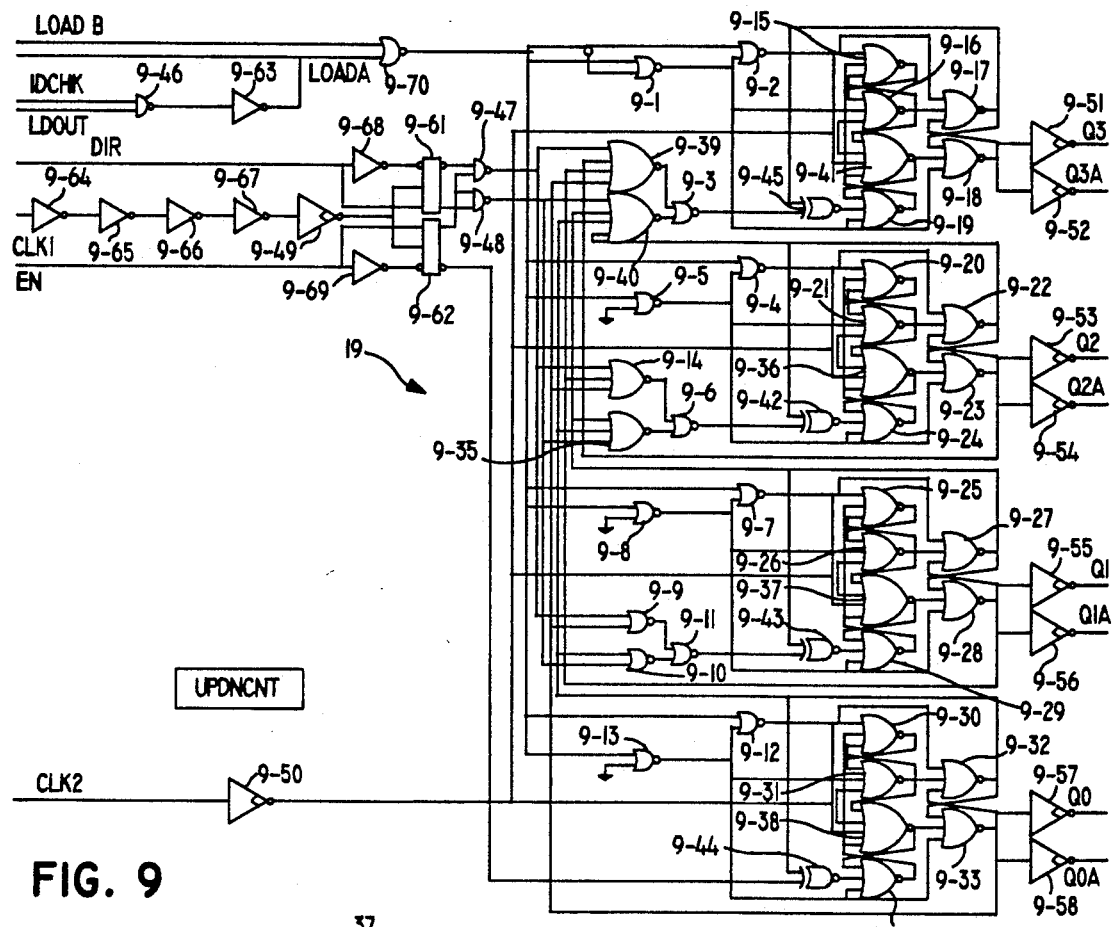
FIG. 9 schematically illustrates the up and down counter earlier represented in FIG. 3.

FIG. 9 provides a more detailed schematic illustration of "up/down" counter 19, generally illustrated earlier in the schematic of FIG. 3. The up/down counter contains inputs for LOADB, IDCHK, LDOUT, CLK1, CLK2, and DIR and EN. CLK1 and CLK2 supply 500 MHz clock pulses from the clock source earlier described. The DIR and EN inputs provide the signals derived from bit size counter 13, earlier described, containing the digital information instructing the up/down counter to count up or down by one or more units. IDCHK represents the idle check input and together with signals applied at LOADB and LDOUT serve to restore the up/down counter to its normal middle position at the appropriate time. The outputs of that circuit are taken at Q0, Q1, Q2 and Q3, each of which is fed through an invertor buffer circuit. A second group of outputs Q0A, Q1A, Q2A, and Q3A, providing identical voltages as the other outputs are also fed through invertor buffer circuits.

In this preferred embodiment the up/down counter is formed of entirely conventional digital devices, including thirteen dual input NOR gates, 9-1 through 9-13, twenty triple input NOR gates, 9-14 through 9-35, six quad input NOR gates, 9-36 through 9-41, a single NOR gate, 9-70, four exclusive NOR gates, 9-42 through 9-45, three AND gates, 9-46, 9-47, and 9-48, a pair of clocked D type latches, 9-61 and 9-62, seven buffers, 9-63 through 9-69, and ten invertor buffers, 9-49 through 9-58. As shown, the counter circuit contains four toggle type flip-flop circuits of identical structure formed of elementary NOR gates. Each of those circuits includes a dual input NOR gate, such as 9-2, an exclusive NOR gate, such as 9-45, five separate triple input NOR gates, such as 9-15, 9-16, 9-17, 9-18, and 9-19, and a quad input NOR gate, such as 9-41, connected as illustrated.

A signal at inputs DIR and EN, appropriately representing either an up, down, or remain in current position, respectively, is converted to a four bit digital data word at the outputs Q0–Q3 and Q0A–Q3A. The data word or code presents that information in a form suitable for use by the multiplex selector switch, 27 of FIG. 3, elsewhere discussed and to the selectors 7-15 in FIG. 7a and 8-15 in FIG. 8, earlier discussed.

Inputs from IDCHK and LDOUT are coupled to two inputs of a dual input AND gate, 9-46, whose output is inverted by invertor 9-63 and applied to the "B" or second input of NOR gate 9-70. An input from LOADB is input to the remaining input of NOR gate 9-70. If the signal Load A or Load B is a high level, the output of the NOR gate serves to provide a synchronous load signal, low level, to the toggle flip-flops in the up/down counter. On the next clock cycle of the 500 MHz clock the counter outputs Q3, Q2, Q1 and Q0 will be set to 0, 1, 1, 1 respectively.

Clock input CLK2 is input to a invertor buffer circuit 9-50 and is applied as illustrated to inputs of NOR gates 9-31, 9-38 also as to provide a clock signal to the toggle flip-flop circuitry via inputs to 9-16 and 9-41, 9-21 and 9-36, 9-26 and 9-37 and 9-31 and 9-38.

The CLK1 input is passed through a series of four inverters 9-64 through 9-67 and invertor buffer 9-49 to the clock input of the D type flip-flops 9-61 and 9-62. The invertor's cause a slight delay in the presentation of the clock pulse so as to avoid "setup" time violations at the data inputs of flip-flops 9-61 and 9-62.

Inputs at DIR and EN are applied respectively to inverters 9-68 and 9-69 to corresponding D inputs of flip-flops 9-61 and 9-62, respectively. The output of the second flip-flop, 9-62, is connected to an input of each of AND gates, 9-47 and 9-48, and the inverted output of flip-flop 9-62 is connected as illustrated to an input of exclusive NOR gate, 9-44, located on the lower right in the figure. The inverted output of flip-flop 9-61 is connected to the second input of NOR gate 9-48. An output from NOR gate 9-47 signifies to the circuit portions to the right that the count is to proceed up, or increase, by an increment of one. Conversely, an output from the second NOR gate, 9-48, is a signal to that portion of the circuit to decrement, or decrease by an increment of one. Essentially, the circuit arrangement depicted is recognized as that of a state machine, one which given a set of inputs produces a particular output. The design is very similar to the industry standard 74L5191 TTL version. A partial listing of the $2^6$ or 64 possible inputs and outputs of this circuit are represented by the diagram of Chart II, presented at the end of this specification.

Figure 10:
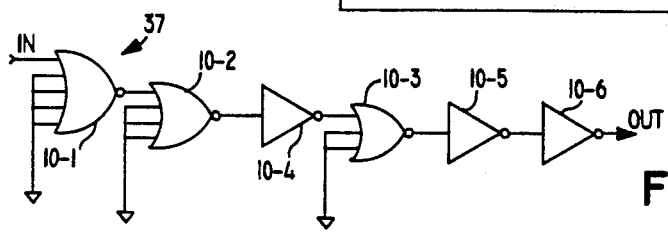
FIG. 10 illustrates the ancillary clock pulse delay circuit, IDELAY, in greater detail.
Figure 11:
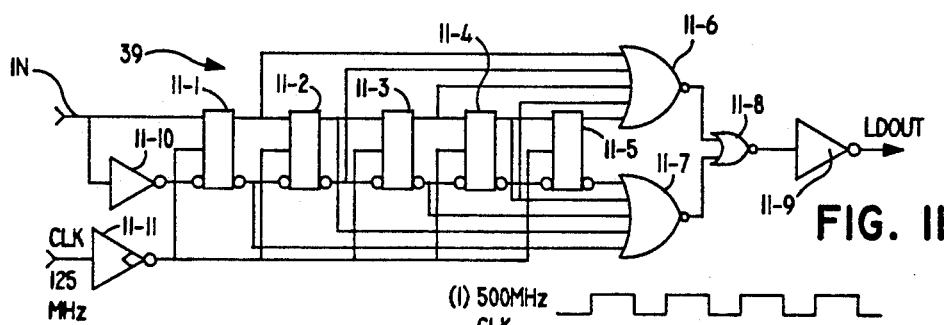
FIGS. 11 and 11B illustrates details of the circuit for checking the output of the circuit of FIG. 10 to detect an idle pattern.

Delay circuit 37 and delay idle circuit 39 of FIG. 3, as provides input to the LDOUT input of up/down counter 19 in the preceding figure, are illustrated in greater detail in FIGS. 10 and 11, respectively, to which reference is made. The delay circuit comprises three NOR gates, 10-1, 10-2 and 10-3, and three inverters, 10-4, 10-5 and 10-6, serially connected as shown. One of the inverters, 10-1, is a five input type, the second a four input type and a third a triple input type, which provides a slight time delay as a digital pulse propagates from its input, IN, to its output, OUT, to slow down the appearance of the next signal edge originating at lead P0 in shift register 3, illustrated in FIG. 3, to subsequent portions of the circuit to ensure that the edge of the pulse outputted from the circuit is delayed in time so as to follow the edge of the 125 MHz clock pulse applied to delay idle circuit 39. The amount of delay may be determined empirically for any specific embodiment; in the present embodiment, the delay is estimated at one nanosecond. The voltage on lead P0 from shift register 3, illustrated in FIG. 3, applied to IN represents the slices of the sampled signal inputted into the major shift register 3, illustrated in FIG. 3, with each 500 MHz clock pulse. When a transition occurs between a voltage high and a low, or vice-versa, the signal appears at input IN. Accordingly, and after a brief delay, the pulse is presented at the output. From that output the delayed "slice" is next input to delay idle circuit, 39, illustrated in FIG. 11, to which reference is made.

Delay Idle Circuit 39, as shown in FIG. 11, determines whether pattern of symbols representing an "idle" pattern is being presented to the shift register. Circuit 39 includes five D-type clocked flip-flops, 11-1 through 11-5, arranged as a shift register, and a pair of five input NOR gates, 11-6 and 11-7, each of which outputs to a corresponding one of the two inputs of a dual input NOR gate 11-8. The output of gate 11-8 is inverted by invertor 11-9 and applied at LDOUT. The clock pulses for the circuit is at the 125 MHz rate, supplied by Divider 39, illustrated in FIG. 3, and is applied through an invertor buffer, 11-11, to the respective flip-flops. The input at IN, which is supplied from the preceding delay circuit 37 just described, is inputted to the initial flip-flop's D input and, via invertor 11-10, is also applied to the second complementary input of that flip-flop. The NOR gates are connected to each of the five stages of the serial input—parallel output shift register as shown. If an alternating bit pattern of 10101 or 01010 is input at IN, representing an idle symbol, then LDOUT will be asserted high. The signal LDOUT taken in conjunction with the IDCHK signal form a "load" indication to the up/down counter 19 illustrated in FIG. 9.

The 125 MHz clock signal is derived from the principal 500 MHz clock through a "divide by four" circuit, as is recalled. While this derivation places the positive going 125 MHz clock pulses in a predetermined phase relationship with those from the 500 MHz clock, it also results in the 125 MHz clock pulses being delayed slightly relative to those of the 500 MHz clock. The delay idle circuit seeks to determine the character of a five bit parallel code as represented in the five stages of the shift register formed of flip-flops 11-1 through 11-5. As the input signal to shift register 3 as monitored at output P0 is driven by the 500 MHz clock, and as the CLK input to Delay Idle Circuit 39 is the 125 MHz clock to ensure the avoidance of "set-up" time violations in flip-flop 11-1, it is necessary to ensure that the 125 MHz clock pulse input at CLK to the clock input of flip-flop 11-1 precedes the P0 pulse applied at input IN to the D input of the flip-flop. Absent delay circuit 37 or equivalent, it is seen that pulse P0 would most likely arrive at the IN input earlier than the arrival of the next 125 MHz clock pulse and thereby cause erroneous result.

Figure 11B:
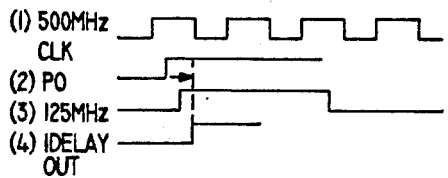

This relationship is graphically illustrated in FIG. 11b which shows the relative positions in time of the 500 MHz clock pulse (1), the P0 pulse (2), the 125 MHz clock pulse (3), and the delayed P0 pulse at the output of delay circuit 37. As shown the relative time position of the vertical edge of positive going pulse P0, which precedes the corresponding edge of the 125 MHz clock pulse, is moved to a succeeding position at output OUT.

Figure 12:
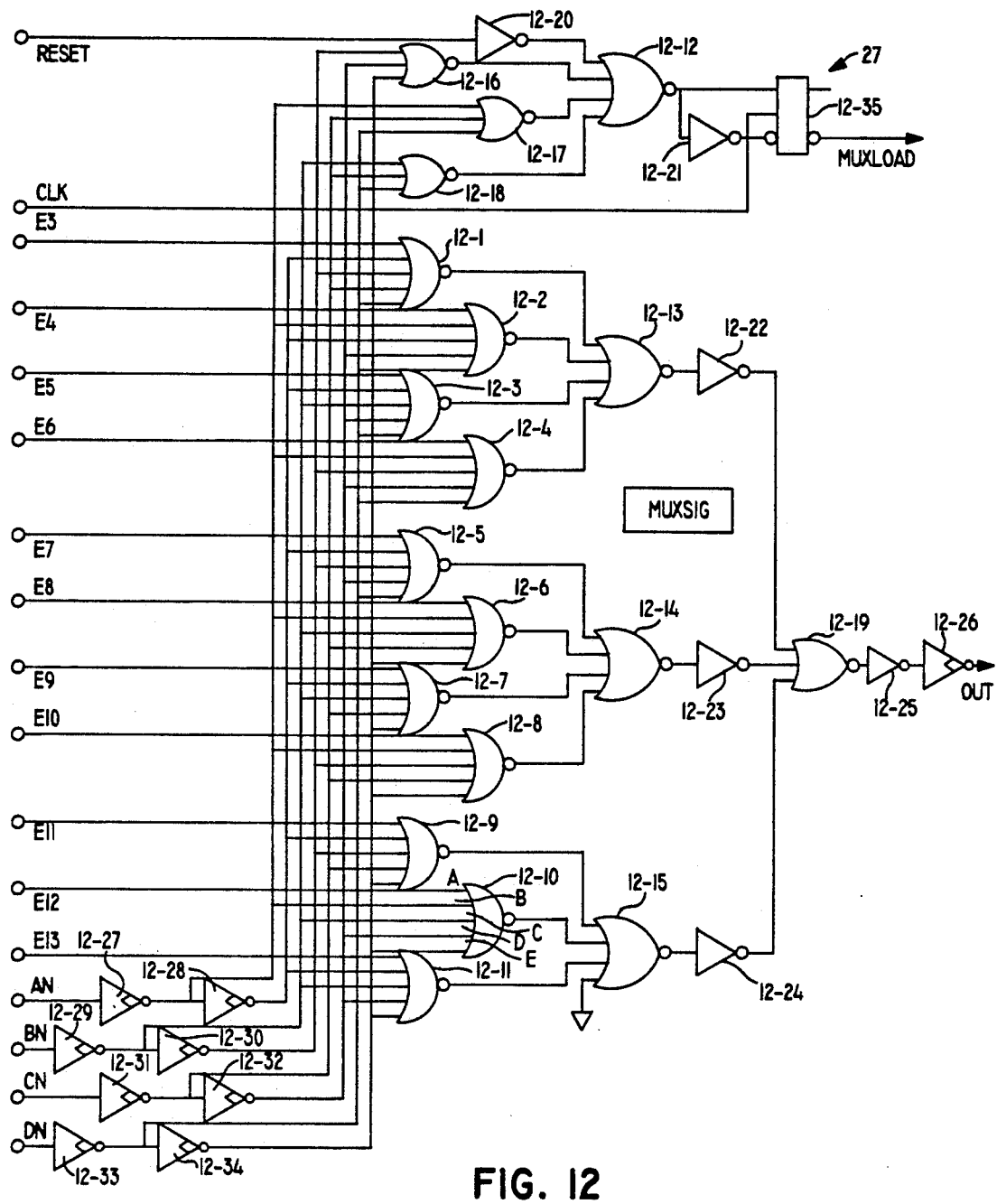
FIG. 12 illustrates schematically in greater detail the multiplex selector used in the embodiment of FIG. 3.

Reference is made to FIG. 12 which presents an electrical schematic of multiplex selector switch 27. The Multiplex selector includes eleven five input NOR gates, 12-1 through 12-11, form four quad input NOR gates, 12-12 through 12-15, six triple input NOR gates, 12-16 through 12-19, six inverters, 12-20 through 12-25, nine invertor buffers, 12-26 through 12-34, and a D-type flip-flop, 12-35, connected as illustrated. Inputs AN, BN, CN and DN provide the selection code applied by up/down counter 19, elsewhere discussed. Inputs E3—E13 represent the various slices or samples of a sampled digital signal or bit as momentarily contained within the initial sampling shift register 3, illustrated in FIG. 3 earlier discussed, that are presented in parallel by that shift register, CLK represents the inverted 500 MHz clock as supplies the clock pulses and input RESET represents the input as restores the circuit to initial conditions, that is initializes the circuit to a known state in preparation for operation.

The Multiplex Selector output includes MUXLOAD and OUT. The former output is the signal applied to the up/down counter, 19, to the center position elsewhere discussed. The NOR gates provide a logic function. With appropriate voltage highs and lows on inputs AN-DN the circuit selects which of the inputs E3-E13 may be coupled through the final invertor 12-25 and invertor buffer 12-26 output at OUT.

For example, with a "1" at each of AN and BN and a "0" at CN and DN, inputs B, C, D, and E of NOR gate 12-10 are placed at "1" condition. This effectively selects input E12. If the input at E12 is a "1" then the circuit provides a "D" output at OUT. If that is a low, or "0", then the circuit provides a "1" output at OUT. The reader may make reference to the description of counter 7-15 illustrated in FIG. 7b for additional details of circuit input and output relationships in as much as they are the same for multiplex selector.

If the code applied results in a condition that does not represent any of leads E3 through E13, then the flip-flop, MUXLOAD toggles to provide an output that is indicative of an error. Upon that error condition the MUXLOAD output is applied to up and down counter 19, described in FIG. 9, and results in that counter being reset to its middle position in preparation for a succeeding operation.

Assume initially that a "normal" set of samples is presented at inputs E3 through E13. As clarification, "normal" means that the input samples represent digital pulses that are of the proper length or duration or width, as variously termed, and that no adjustments, up or down, are required as would be performed by the bit size counter 13 and up/down counter 19. With the normal length pulse being input to the system, one finds that the samples at E3 through E13 would be a voltage high at inputs E3, E4, E5 and E6, which represent the normal duration of a pulse, four samples taken two nanoseconds apart, the voltage at E7, E8, E9 and E10 is a voltage low, and the voltage at E11, E12 and E13 is, again, a voltage high. With a normal pulse, the code supplied by inputs AN, BN, CN and DN is such as to allow selection of input E8. Input E8 would thus be connected through gates 12-6, 12-14, 12-19 and invertor 12-25 and 12-26 to the output OUT. In this example at that instant of time hypothesized the output at OUT is a voltage low.

It is recalled that the samples in shift register 3 are advanced through the register, step-by-step, with each clock cycle of the 500 MHz clock 5. Accordingly, the samples at E3 through E13 are effectively "paraded out" of shift register 3, that is, the sample at E3 is advanced into position E4, that of E4 into position E5 and so on, with the sample at E12 being moved into position E13 and the prior sample at E13 being moved out of the register. In the example given before this results in the voltage low at input E7 now appearing at lead E8. As before, that row is reflected at output OUT of the multiplex switch. At the next clock cycle the sample presently residing in E7 is moved into position E8. This sample was the voltage high that, two steps before, was originally present at position E6 at the commencement of the example. The output at E8, now a voltage high, is passed through to the output via invertor 12-26 and the series of gates previously described. With each clock pulse of the 500 MHz clock these samples "step" or march through for an additional period of at least four additional samples or clock pulses. Thus, the output at OUT goes from voltage low to a voltage high and remains at that high for several clock cycles, replicating the stored samples, which in turn replicates the original digital pulse or bit. In this way, the original parallel input information on inputs E3 through E13 is provided as a serial output at OUT.

It is recalled that sample shift register 3 is continuously receiving new data bits and advancing them through its internal registers. Accordingly, the parade of pulses continues anew as sample information at E3, E4 and so on is coupled in from shift register 3.

As earlier described, the edge detector 9, bit size counter 13, and up/down counter 19 determine whether the pulse presented into shift register 3 is of the proper length for adjustments and provides an appropriate coded output at 25 to multiplex switch 27 via inputs AN, BN, CN, and DN. If, for example, those circuits determine that the pulse is too long, that is, the low pulse is too long, it will select a different initial output. For example, the codes may select lead E7 instead. That results in the samples presented at E7 being output from the circuit and shortens the "low" period, i.e., as the parade of samples moves forward there is one less "low" sample being output. Conversely, if the described circuits determine that the length of the low portion of the pulse is too short it will lengthen that pulse as presented in the serial form at outputs OUT by instead selecting lead E9 for initial connections to output OUT. In so doing, it takes longer to pass the parade of low pulses past that position as the samples progress from the E3 position through the E13 position.

It is apparent that instances may occur wherein the stream of symbol bits presented at inputs AN through BN, requires a total delay or lengthening greater than five sample bits or a total shortening greater than five sample bits. One possible cause for the foregoing requirement is due to the fact that an inherent frequency difference may exist between the demodulator's local 125 MHz clock and the clock frequency of the device sourcing the symbol bit stream to the demodulator. If, for example, the symbol bits are sourced at a frequency of 125.001 MHz and the demodulator's clock frequency is 124.99 MHz then if enough symbol bits are input before an idle symbol stream is decoded, the demodulator will eventually move the selection of multiplex switch 27 past E3 and select gate 12-17, thus resulting in an output at maxload. In such a situation the code selects gate 12-16, 12-17 or 12-18. This causes gate 12-12 and flip-flop 12-35 to operate providing an output at MUXLOAD. The change in outputs causes the up-/down counter through input LOADB to reset to the middle position. The circuit thus contains a form of protection against providing erroneous output signals and, in that sense, is self-correcting.

By selecting one of the E leads in this manner, the length of a pulse may be effectively lengthened or shortened as earlier described in connection with the general circuit operation in FIGS. 1 and 3.

Figure 13A:
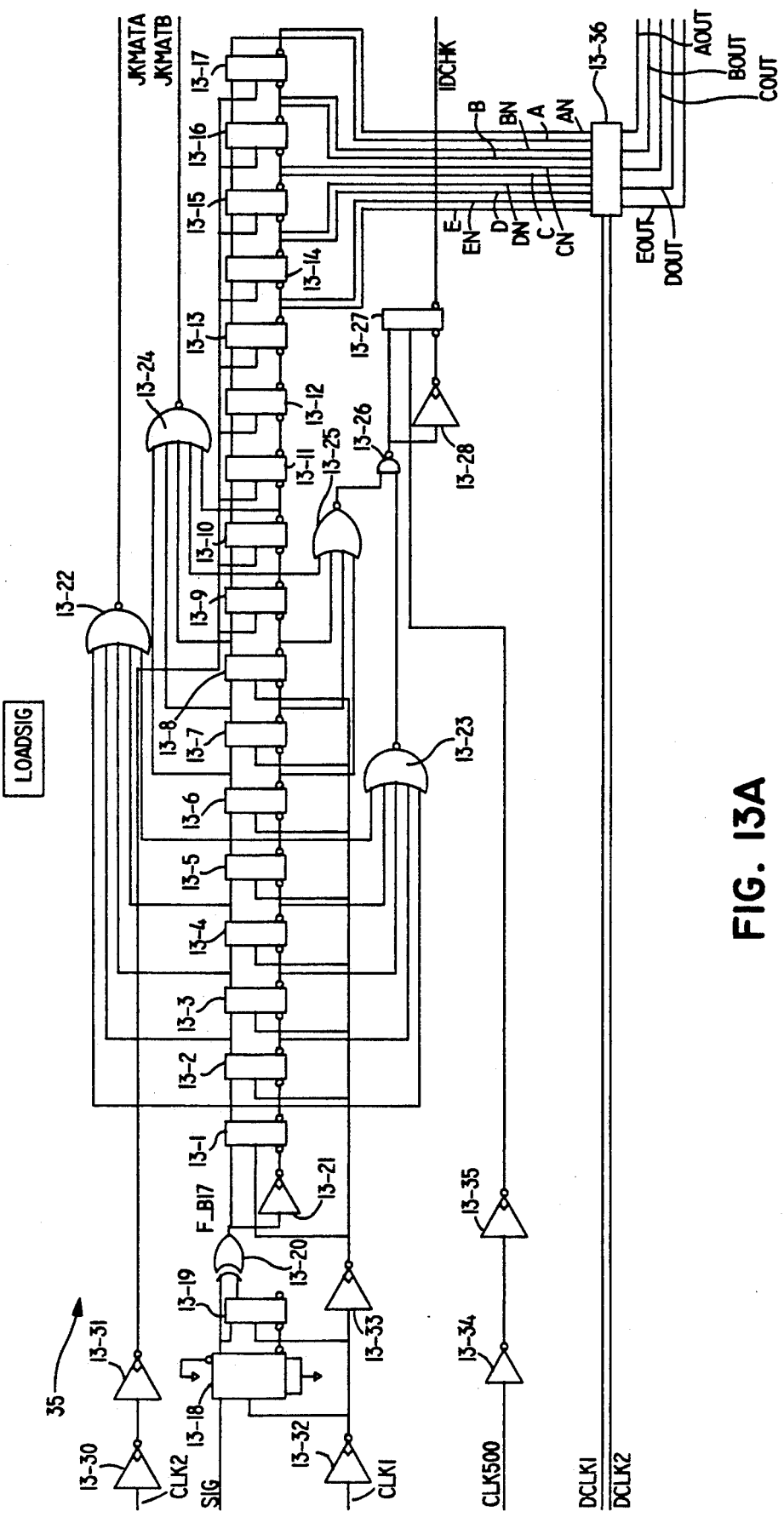
FIGS. 13A and 13B illustrate in electrical schematic form the NRZI decoder and symbol detector, referred to in FIG. 3.

Reference is made to FIG. 13a which illustrates NRZI Decoder and Symbol Detector 35 in greater detail. The input at SIG, it is recalled, appears in an NRZI signal format. The circuit includes a decoder, serving to convert the NRZI formatted signal to an NRZ type signal. This latter NRZ type signal, in which the voltage highs and lows represent "true" data as opposed to transitions or pulse edges, is serially loaded into and passes through the shift register. As is conventional in any shift register, digital information inputted is momentarily stored in an initial stage until the receipt of the next clock pulse as causes the information in one stage to be transferred or passed to the next succeeding stage. With continuing clock pulses the information is advanced or stopped to successive stages, ultimately being dropped out at the end of the chain.

The NRZI Decoder and Symbol Detector includes a 17 stage shift register consisting of flip-flops 13-1 through 13-17, numbered from left to right, an NRGI to NRD demodulator formed of flip-flop 13-18 and flip-flop 13-19, which output through exclusive OR gate, 13-20, connected as illustrated. The output of the decoder is applied to the first stage flip-flop, 13-1, directly and indirectly through invertor 13-21 to the second flip-flop input. Three five input OR gates, 13-22, 13-23, and 13-24, and a quad input OR gate, 13-25, are connected as shown to various stages of the shift register illustrated.

The last five stages of the shift register are input to circuit PPSHIFT, 13-36, described in greater detail in connection with FIG. 13b, from which a five bit parallel word, represented by the five outputs of the PPSHIFT circuit AOUT, BOUT, COUT, DOUT and EOUT. The outputs of NOR gates 13-23 and 13-25 are input to a dual input AND gate 13-26. In turn, the output of NOR gate 13-26 is coupled to the inputs of a D type clocked flip-flop, 13-27, directly to the first input, D, and, indirectly, through an invertor, 13-28, to the complementary input. The output of flip-flop 13-27 serves to provide output IDCHK, which indicates when IDLE symbols are present in the data stream. This signal, taken along with LDOUT from delay circuit 39 of FIG. 11, is used to reset the UPNCNT up/down counter 19.

The circuit includes inputs CLK1, representing the 125 MHz clock, CLK2, also representing the 125 MHz clock, and CLK500, representing the 500 MHz clock. Inputs DCLK1 and DCLK2, represents the 25 MHz symbol clocking clock, and input SIG, represents the serial data bits of the input signal. Invertor 13-30 and invertor buffer 13-31 are connected in series between input CLK2 and the clock inputs of the last nine flip-flops of the shift register. Invertor 13-31 is connected to the clock inputs of flip-flops 13-18 and 13-19 and through invertor buffer 13-33 to the clock inputs of the initial stages of the shift register. Input CLK500 is connected in series with invertor 13-34 and invertor-buffer 13-35 to the clock input of flip-flop 13-27. The outputs of the circuit are identified as JKMATA and JKMATB.

The digital signal appearing at input SIG, which represents transitions according to the NRZI code, is converted in the demodulator circuit to an NRZ signal output from Exclusive OR gate 13-20 and represents true digital data. The latter NRZ form is input to the 17 stage serial shift register. As the data, or bits representing individual portions of a digital word in serial form, are sequentially advanced from the beginning to the later stages of the shift register, the OR gates 13-22 and 13-24 detect the sequence of five bits, representing a J, and the sequence of bits that represent a K symbol, and provide appropriate "true" output JKMATA and JKMATB, respectively.

Diverging momentarily, it is recalled that under the ANSI standards any data transmission is to be proceeded by a combination of symbols J and K. Preliminary to the circuit's action described, the circuits must detect that symbol sequence. That detection is also performed by the NRZI Decoder and Symbol Detector 35. Thus, if a J is detected as represented on NOR gate 13-24 by each of the circuit elements 13-1 through 13-5 and output occurs at JKMATB. In like manner, if the next succeeding pulse is represented by a K then the output of NOR gate 13-24 as represented by at each of 13-6 through 13-10 provides a high output at JKMATA which is coupled to the JK Match Detector 43, represented in FIG. 1. The outputs of the individual flip-flops representing those control symbols are presented in the tables which follow.

| J MATCH AT OUTPUT OF JKMATB | |
|---|---|
| Output (Q) | |
| (The J symbol was sent first) | |
| 13-6 | 0 = J |
| 13-7 | 0 = J |
| 13-8 | 0 = J |
| 13-9 | 1 = J |
| 13-10 | 1 = J |
| (K Match at output of JKMATA) | |
| 13-1 | 1 = K |
| 13-2 | 0 = K |
| 13-3 | 0 = K |
| 13-4 | 0 = K |
| 13-5 | 1 = K |

Figure 14A:
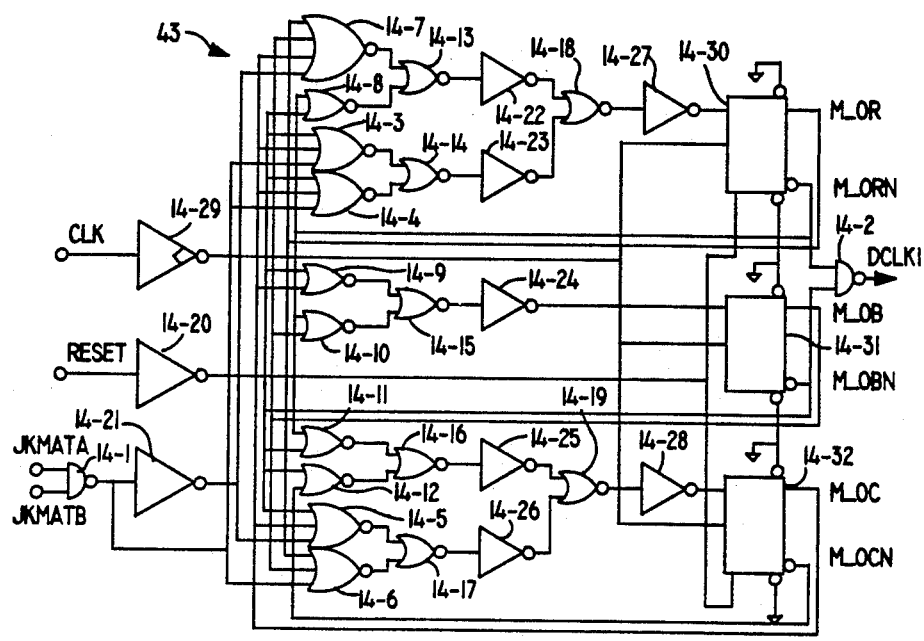
FIG. 14A schematically illustrates in greater detail the JK match and clock generator element of the demodulator presented in FIG. 3 and associated FIGS. 14B and 14C provide a state diagram and timing wave forms therefore, respectively.

Outputs JKAMTA and JKAMTB are coupled to the inputs of the Byte Clock circuit, presented in detail in FIG. 14a, thereafter. In turn that Byte Clock circuit provides appropriate clock pulses to input DCLK1 in this Decoder and Symbol Detector Circuit.

Continuing with the principal operation, as the string of bits progresses into the last stages, 13-13 through 13-17, of the shift register, the circuit PPSHIFT 13-36 effectively decodes the last five bits to produce a corresponding digital word in parallel form at outputs AOUT through EOUT. Accordingly, as each of the J and K symbols are detected by OR gates 13-22 and 13-24 that symbol information is advanced through the register and subsequently are read out in parallel form, that is in groups of five, by PPSHIFT 13-36 under control of clocking pulses from CLK1 and CLK2 at the 125 MHz rate as earlier described. With the DCLK1 and DCLK2 clock signals, which operate the PPSHIFT circuit, provided at a 25 MHz rate, a 1 to 5 transmission rate ratio is obtained. The last five pulses of the main clock fill the last 5 stages of the shift register and only then does the 25 MHz clock signal permit read-out from circuit PPSHIFT. A more detailed illustration of PPSHIFT 13-36 is presented in FIG. 13b to which reference is next made.

Figure 13B:
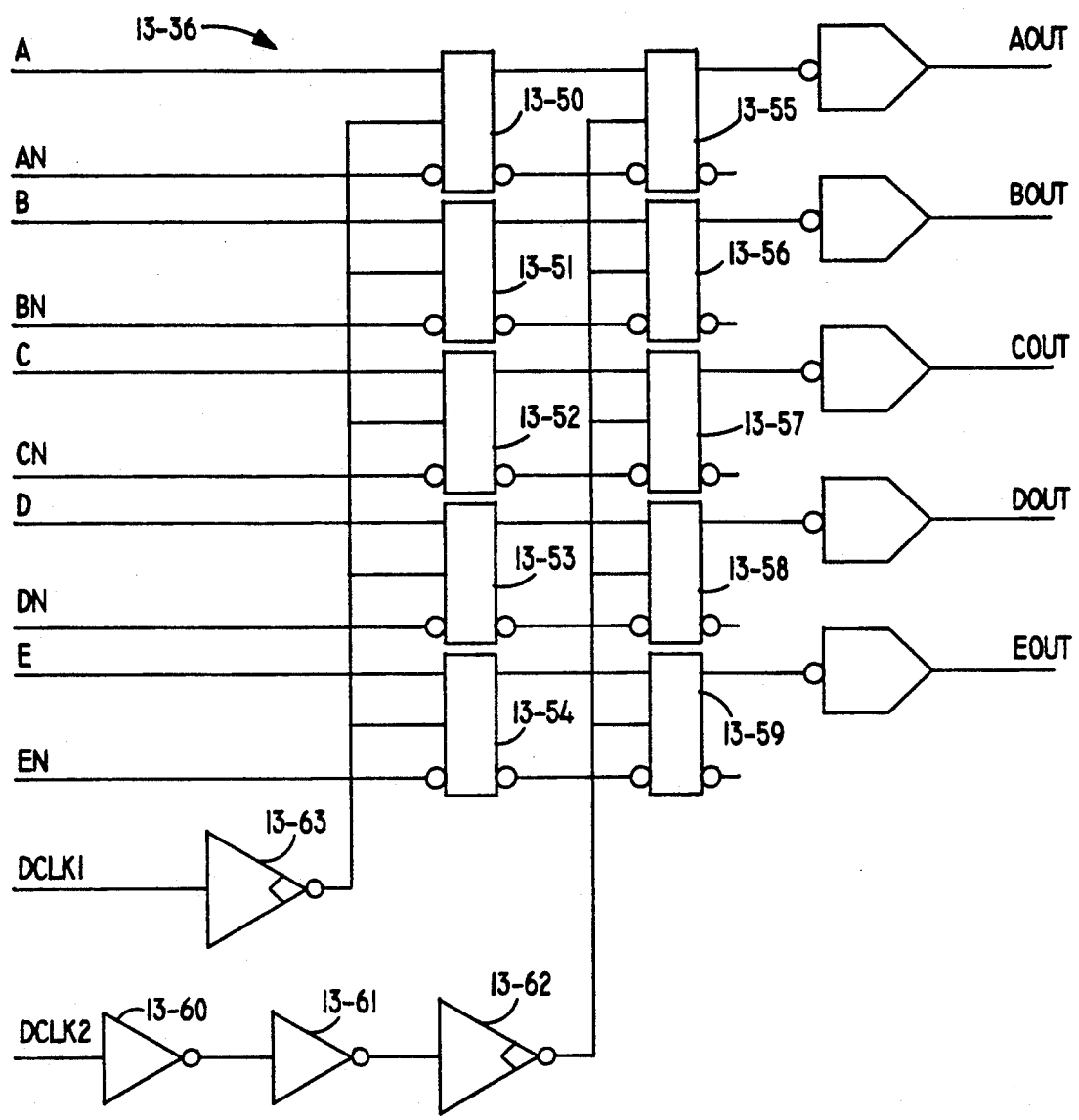

As shown in FIG. 13b the parallel-to-parallel shift register formed by the illustrated flip-flops guarantees that the output of the J and K signals are of the correct time duration. This circuit includes inputs A-E representing the five bits of the parallel five bit data word, inputs AN-EN, which represent the complement to the same digital word or symbol, and DCLK1 and DCLK2, which represent the 25 MHz clock signal. The outputs AOUT-EOUT represent the output of the demodulator as earlier presented in the overall circuit diagram of FIG. 1.

Circuit PPSHIFT includes a first stage containing five D-type flip-flops, 13-50 through 13-54, and a second stage containing five D-type flip-flops, 13-55 through 13-59. The clock input, DCLK2, to the second stage is input via two inverters, 13-60 and 13-61, and invertor buffer, 13-62, serially connected, which provides a slight time delay. Clock DCLK1 is supplied to the clock inputs of the first stage flip-flops via invertor buffer, 13-63. When clock DCLK1 appears the flip-flops 13-50 through 13-54 are toggled as necessary to the states defined by inputs at A-E and AN-EN, and the outputs are input to the next parallel stage of flip-flops. Upon receipt of a clock pulse at DCLK2 the flip-flops 13-55 through 13-59 are toggled accordingly to provide the five bit parallel output. This process repeats.

Returning to FIG. 13a as succeeding data information passes through the last five stages of the shift register formed by flip-flops 13-1 through 13-17, the outputs of the last five flip-flops, 13-13 through 13-17 are connected simultaneously to PPSHIFT 13-36. That data presented in parallel via the leads illustrated is then read out as a five bit parallel code over AOUT through EOUT under control of clock signals DCLK1 and DCLK2, the latter originating in circuit 19 and data clock circuit 21 respectively. It is noted that the five bit parallel code is used by ancillary digital electronic equipment, such as computers located at the station, the details of which need not be described. In turn, the output of that equipment is also a five bit parallel code. That parallel code necessarily must be converted back into serial form in order to send the data transmission into the LAN network. This is the purpose of the modulator section of the chip represented in FIG. 19, discussed later in this specification.

Reference is made to the detailed schematic of FIG. 14a, illustrating the Byte Clock 43, sometimes referred to as the slip byte clock. The circuit contains inputs CLK, representing the 500 MHz clock, a reset input through which the circuit receives a pulse to reset or "initialize" the circuit and inputs, JKMATA and JKMATB, representing inputs occurring when the sequence of the "J" and the "K" symbols have been detected by other circuitry. At output DCLK1 a pulse wave form, having a frequency or periodicity of 25 MHz is outputted. That output signal represents a division by 5 of the demodulator clock input at CLK, latter of which is at 125 MHz.

As illustrated, Byte Clock 43 includes a pair of dual input NAND gates, 14-1 and 14-2, at each of the input and the output. Seventeen NOR gates, of which four, 14-3, 14-4, 14-5, and 14-6, are of the triple input type, one, 14-7, is a quad input type, and the remainder, 14-8 through 14-19, are dual input types. Nine inverters, 14-20 through 14-28, and one invertor buffer, 14-29, and three reset type clocked D flip-flops, 14-30, 14-31, and 14-32. The circuit constitutes a "state" machine. Using the inputs at JKMATA and JKMATB, the circuit logic, that is the logic defined by the circuit, conditions flip-flops 12-30, 12-31 and 12-32 to produce input to the final NAND gate, 12-2, as produces a periodic wave form, a wave form that is a voltage high for a portion of the cycle and low for the remaining portion of a cycle with the cycles having a periodicity of 25 MHz.

The Boolean Logic equation and the input and output that define and characterize the operations of the "state machine" generator are presented in Chart III. This chart may be considered together with FIGS. 14b, which illustrates a state diagram for the generator, and FIG. 14c, which illustrates typical output timing wave forms.

The first three columns of Chart III present the present state of each of flip-flops 14-30, 14-31 and 14-32, represented in the "zero" and "one" notations, previously discussed. The input JK is presented in the fourth column, and is either a zero or "1"; the next state, assumed by flip-flops 14-30, 14-31, and 14-32, upon the input is represented in the fifth, sixth, and seventh columns and the output at DCLK1 is represented in the last column.

It is noted that the input JK represented in this chart represents the output of NAND GATE 14-1, in FIG. 14a. That NAND GATE receives two inputs at JKMATA and JKMATB and, effectively, combines those two inputs into one at the gate's output. Considering the first row in the chart in which the initial state is represented as zero, zero, zero, and the input at JK as zero, the generator changes to the zero, zero, one state and gate 14-2 provides an output of "1" at output DCLK1.

Figure 14B:
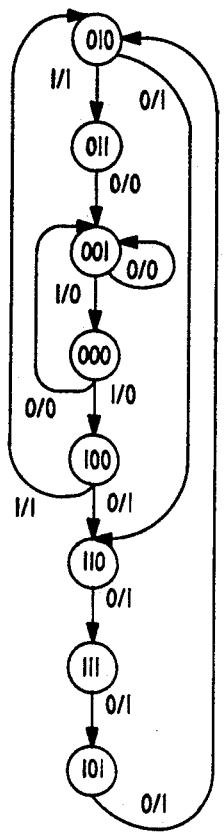
FIG. 14D is a timing diagram.

Referring to the state diagram of FIG. 14b the zero, zero, zero state is represented by the circle in the center of the diagram, containing zero, zero, zero. With an input of zero, the output is zero, represented as 0/0, and the generator follows the path represented by the arrow to the state represented by the overlying circle containing zero, zero, one. Considering the fourth row in the chart in which the present state of flip-flops 14-30, 14-31, and 14-32 is zero, zero, one, and an input of one at JK, the generator changes to the state represented as zero, zero, zero with an output at DCLK of zero. This is represented in FIG. 14b by the circle containing zero, zero, one, with input one and output one denoted "1/0" and the arrow, indicating the change of state to the circle containing zero, zero, zero. As those skilled in the art appreciate, the foregoing fully describes the operation of the byte clock generator of FIG. 14a.

Figure 14C:
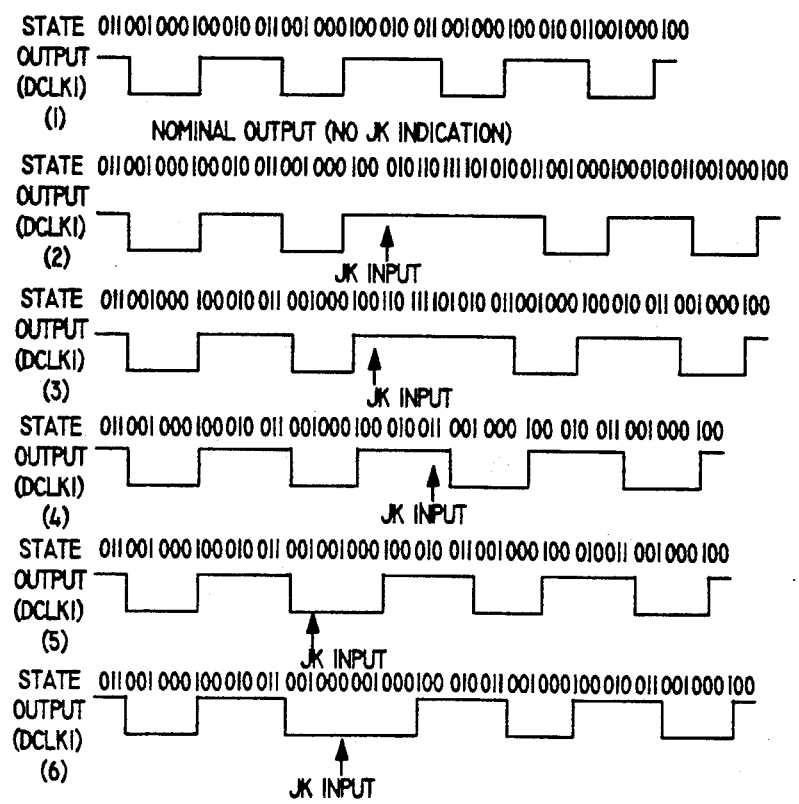

Reference is made to the wave form diagram of FIG. 14c. In that diagram various outputs are presented as a function of time and also illustrate the various states of the state machine on those occasions. These are presented in the various FIGS. 14c(1), (2), (3), (4), (5), and (6).

When the inputs at JKMATA and JKMATB, in FIG. 14a, do not indicate detection of the JK symbols, then the output wave form at DCLK1 is the periodic wave form presented in FIG. 14C(1). The generator changes its states as indicated. If instead an input, representing a JK detection is made, then the output wave form may be any one of the wave forms represented in FIGS. 14C(2) through 14C(5). The introduction of a digital one at the JK input changes the "duty cycle" of the output wave form, stretching or changing, the position between the third and fourth high output pulse as in the case of FIGS. 14C(2) and 14C(3); or lengthens the duration of one of the low output pulses, the second from the left in the figure, as represented in connection with the second high going pulse in each of FIGS. 14C(5) and 14C(6). A special case is indicated in connection with FIG. 14C(4) in which the JK input occurs when the SLPBYTECLK is in state 011 (ABC). As is apparent, there is no change in the output wave form between the nominal output condition represented in 14C(1) and 14C(4); the input pulse is effectively ignored. This represents the situation where the symbol grouping of IDLE bits was consistent with the symbol boundary of the J and K symbols which were detected. This is considered with the connection of timing diagram of FIG. 14d.

As is apparent A JK input can occur at different times following the output going to a voltage high as representing the 0, 0, 1 state depicted in these figures. It is desirable to permit the J symbol to effectively "slip"; even though detected, if the detection does not match the current symbol boundaries defined by DCLK1. By permitting the "slip", the circuit can effectively generate another idle symbol, allowing the succeeding circuits to continue to act or function as if an idle condition existed. Inasmuch as the J symbol remains detected, upon the next cycle of the generator, the detection occurs early on in that succeeding clock cycle, essentially as represented in FIG. 14C(3) in FIG. 14. At that time the output of the Byte Clock changes. As those skilled in the art appreciate, the Byte Clock provides for a more reliable, error free operation of the demodulator.

With regard to FIG. 14c, for each waveform example listed it should be noted that following a JK input indication of 1, the output DCLK1 always has a transition, low to high, seven clock cycles later. This low to high transition is important because it represents the parallel loading in FIG. 13a of the J symbol from flip-flops 13—13 through 13-17 into the first parallel stage of the shift register PPSHFT, illustrated in FIG. 13a and FIG. 13b. Subsequently five clock cycles later the K symbol is loaded by the next DCLK1 rising edge into the first stage of the output shift register 13-36 PPSHFT and so on.

Clock input DCLK2, which has a known phase relationship with DCLK1, is used in shift register 13-36, FIG. 13b, to shift the five bit symbol in flip-flops 13-50 through 13-54 in parallel into the flip-flops 13-55 through 13-59.

Figure 14D:
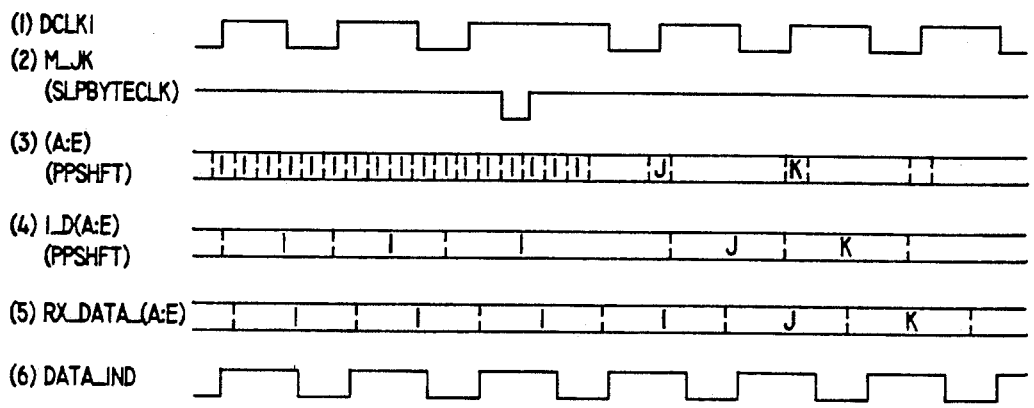

In FIG. 14d, "I" represents an idle signal, J represents the J symbol, and K the K symbol. The outputs at DCLK1 and DATA_IND are offset by one-half of a 125 MHz clock period, approximately 40 ns. Signals DATA IND and DCLK2 (rrom ppshift), which appears in FIG. 13b as part of the shift register 13-36, are of the same frequency and phase reference. All signal names correspond to these indicated in the general demodulator schematic of FIG. 3.

Thus, FIG. 14d(1) depicts an exemplary output waveform at DCLK1 in the schematic of FIG. 14a; FIG. 14d(2) illustrates the output of NAND gate 12-1 upon receipt of the input at JKMATA; FIG. 14d(3) depicts the corresponding signals defined by inputs A through E of the PPSHIFT circuit 13-36 in FIG. 13b; FIG. 14d(4) the I-D signals at A through E at the second stage of PPSHIFT 13-36 in FIG. 13b; FIG. 14d(5) the symbol defined by AOUT through EOUT outputs if PPSHIFT 13-36; and FIG. 14d(6) presents the DATA-IND output of data clock 31, earlier referenced in FIG. 3 and described hereafter in FIG. 16 in greater detail.

As shown in the waveforms of FIG. 14d an idle symbol may reside at the output of flip-flops 13-50 through 13-54 (I_DCA:E) FIG. 14d(4) for longer than five cycles of the 125 MHz clock. This idle symbol may in turn be loaded twice consecutively into flip-flops 13-55 through 13-59, FIG. 13b, before the J symbol is at the proper position on the outputs of 13-13 through 13-17 to be loaded into flip-flops 13-50 through 13-54 with a rising edge of DCLK1. This maintains a constant and correct relationship between Data_Ind and the RX_DATA_(A:E) symbol output.

Figure 15:
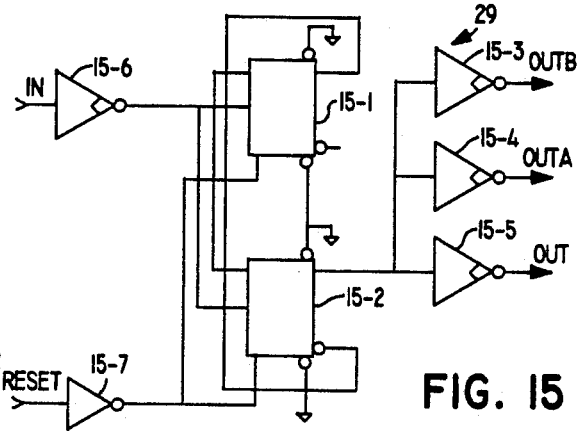
FIG. 15 illustrates schematically the divide by four circuit represented in FIG. 3 in block form.

The Divide-by-Four clock circuit 29, earlier referenced, is illustrated in greater detail in FIG. 15. This clock circuit incorporates two re-settable D type flip-flops, 15-1 and 15-2, three buffered inverters, 15-3, 15-4, and 15-5, that serve as the outputs, respectively, OUTA, OUTB and OUT, which are coupled to portions of the circuit shown in the overall schematic diagram of FIG. 3, and often referred to herein before as the 125 MHz clock signals. The circuit also contains a fourth invertor buffer, 15-6, connected to input IN and an invertor, 15-7, connected respectively to the 500 MHz clock input and to the reset input. With a 500 MHz clock pulses input at IN, the circuit provides a 125 MHz output to supply clock pulses of that lower frequency for distribution among the various circuits illustrated in the schematic of FIG. 3. It is noted that the 125 MHz also represents the rate at which data transmission is occurring over the circuits from which the demodulator receives data at the INA and INB complementary inputs.

Figure 16:
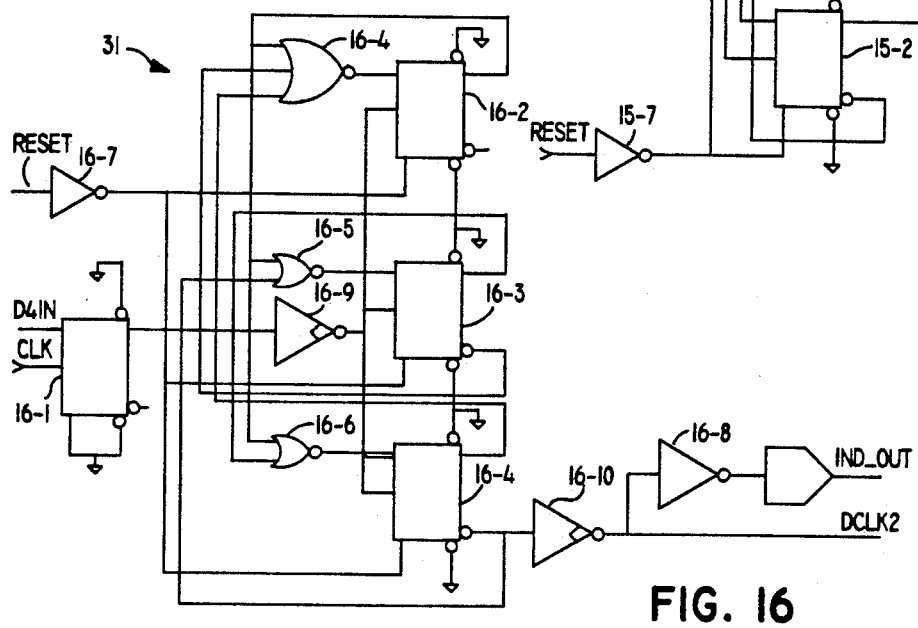
FIG. 16 illustrates the data clock element in a more detailed electrical schematic form.

The data clock circuit 31 of FIG. 16, illustrated in the schematic of FIG. 3, incorporates four re-settable D-type flip-flops, 16-1, 16-2, 16-3, and 16-4, three NOR gates of which one, 16-4, is a three input type and the remaining two, 16-5 and 16-6, are dual input type, a pair of inverters, 16-7 and 16-8, and invertor buffers, 16-9 and 16-10. The data clock circuit receives an input CLK from the 500 MHz clock and at its outputs, IND-OUT and DCLK2 provides an output pulse that effectively is one-fifth the period of the input clock period. As in the prior cases, the initialization of the circuit occurs when the reset pulse is applied at input RESET, which resets the flip-flops to a low output state. Flip-flop 16-1 is used to re-synchronize the 125 MHz clock signal input at D4IN to the 500 MHz clock. The 125 MHz signal at the output of flip-flop 16-1 provides the clock signal for the divide by 5 circuit. The circuit functions as a state machine, the states of which are presented in Chart IV located at the end of this specification.

Effectively, the data clock circuit divides the input clock rates by five; with a 500 MHz clock input and a 125 MHz input at D4IN the output at DCLK1 is a 25 MHz pulse repetition rate.

The foregoing description defines the elements of the demodulator and the relationship and operation for the preferred form. A more detailed description of the elements of the companion modulator is next considered.

The modulator portion of the circuit was earlier illustrated in functional block diagram form in FIG. 2. The inputs to the modulator originate from other computer processing equipment that processes digital information in the form of a parallel five bit digital word and outputs that five bit word to the modulator for conversion into a serial form suitable for transmission along the transmission line, in this case at a 125 MHz rate. That external processing equipment also supplies an appropriate synchronization signal to the modulator. This synchronization signal has a known phase relationship to the 125 MHz clock generated in the demodulator circuit block as was earlier described in connection with that block diagram.

Making momentary reference to the block diagram of FIG. 2 the external processing equipment at this station, not illustrated, supplies the five bit parallel code at modulator input TXSYMBOL, which is loaded into symbol load buffer 51. A synchronizing signal indicative that the particular digital word has been applied to the five inputs, is applied at input TX REQ, into symbol load synchronizer 53 block. Lastly, since the serial data transmission is to occur at the 125 MHz rate, a clock signal is applied to the input CLK and is routed to the symbol load synchronizer and to a parallel to serial shift register. The 125 MHz clock is related in phase to the Tx REQ input, which serves as the symbol clock. Through its output, symbol load synchronizer provides synchronizing pulses to both the symbol load buffer and to the parallel to serial shift register. The parallel to serial shift register receives the five bit symbol at parallel inputs. Given that input the information is sequenced out under control of the clock as a serial stream, suitably an NRZ bit stream. The NRZ bit stream is inputted to NRZI encoder 57, which in turn encodes the serial information in the NRZI form and outputs that serial stream to the transmission line interface, the electronic to light converter, not illustrated, as does the appropriate light flashing to the fiber optic cable.

The functional block diagram of the modulator presented in FIG. 2 is illustrated in greater detail in the schematic diagram of FIG. 17, to which reference is made. The portions of FIG. 17 indicated as TXLOAD 17-20, PXENCODE 17-22, and PSSHFT 17-21, are presented in corresponding more detailed schematic form in FIGS. 18, 19 and 20, discussed hereinafter. The modulator includes five resettable D-type clocked flip-flops, 17-1 through 17-5, eight buffers, 17-6 through 17-13, and an invertor buffer, 17-14. The modulator inputs at TXA, TXB, TXC, TXD, TXE, represent data input. Those inputs are buffered by buffers 17-6 through 17-10, which serves as the symbol load buffer 51, illustrated in FIG. 2 in block form, respectively, and are inputted into the respective, or corresponding, one of the D-inputs of flip-flops, 17-1 through 17-5, as illustrated. The request signal input at REQ is sent via Buffer 17-11 to the requisition input of the symbol load buffer circuit, 17-20, TXLOAD; the 125 MHz clock signal is input at input DIV4OUT to each of TXLOAD and to the clock input of a parallel to serial shift register, 17-21, PSSHIFT and to NRZI encoder, 17-22, TXENCODE. A reset input, RST, is coupled to the reset inputs of each of TXLOAD, PSSHIFT, and TXENCODE. That reset is also applied via Buffer 17-12 to the reset inputs of each of the flip-flops. The outputs of the five flip-flops, 17-1 through 17-5, are input to the corresponding five inputs of shift register 17-21, PSSHFT, at inputs labeled A–E in the figure. The modulators outputs are taken at TX TR and TXNTR and represent complementary outputs of the same serial signal.

Figure 18:
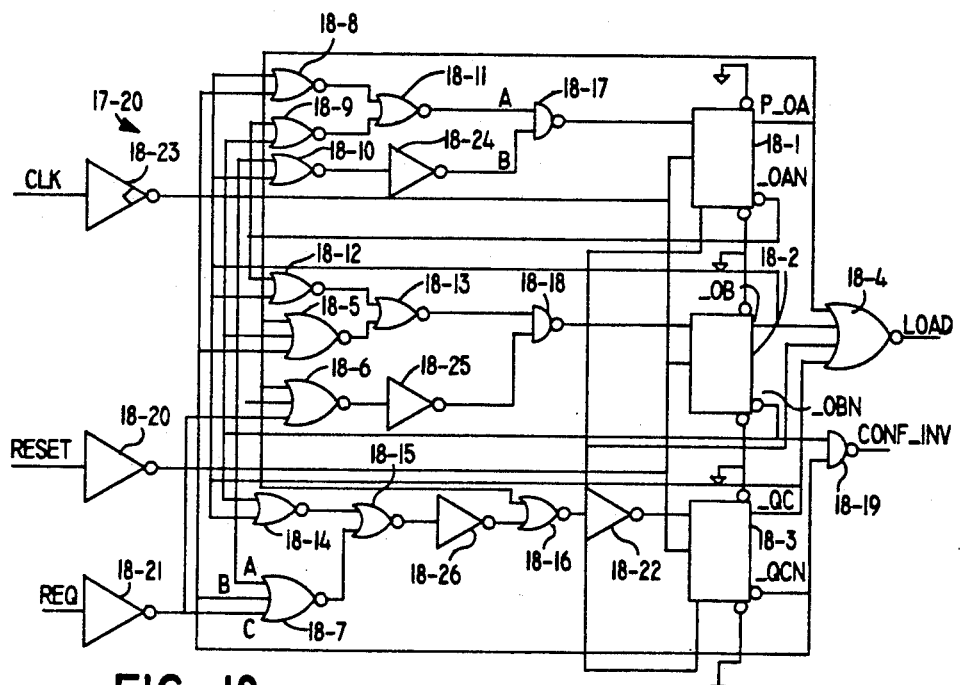
FIG. 18 is a more detailed schematic of the Symbol Load Synchronizer element of the modulator as presented in FIG. 17.

Reference is made to FIG. 18 schematically illustrating symbol load synchronizer 17-20. As the experienced reader appreciates the circuit depicted is essentially a state machine in which, given a certain sequence of inputs, a predetermined output is logically defined. The circuit includes three resettable D-type clocked flip-flops, 18-1, 18-2, and 18-3, one quad input NOR gate, 18-4, three triple input NOR gates, 18-5, 18-6 and 18-7, nine dual input NOR gates, 18-8 through 18-16, three NAND gates, 18-17, 18—18, and 18-19, six inverters, 18-20, 18-21, 18-22, 18-24, 18-25 and 18-26 and one invertor buffer, 18-23, connected as illustrated.

A reset signal applied at input RESET, typically upon commencement of circuit operation so as to place the flip-flops in a pre-determined state, that is, to "initialize" the circuit. The 125 MHz clock signal is applied at input CLK and is routed to the clock inputs of each flip-flop. When a request signal is applied at input REQ and routed via buffer 18-21 to the C input of NOR gates 18-6 and 18-7 the state machine functions once the circuit serves to sample the REQ signal line every five periods of the 125 MHz clock. If REQ is asserted "high" when sampled, the LOAD signal is then asserted "high" and the flip-flops, 17-1 through 17-5, of FIG. 17 are clocked. The output is provided by NOR gate 18-4 at LOAD.

The load synchronizer is recognized as a state machine. The inputs and outputs are presented for convenience in Chart V located at the rear of this specification. It is noted also that when an output is provided by flip-flop 18-2 and a second output from QCN of flip-flop 18-3 is applied at input B of NAND gate 18-17, a signal is also output by gate 18-19 at CONF.

Returning momentarily to FIG. 17, it is seen that the confirmation output is applied through buffer to a lead on the board for connection with other equipment, not illustrated, the description of which is not necessary to an understanding of the invention. CONFIRMATION serves to provide indication to the device supplying the REQ with confirmation that the requested symbol load has occurred. The LOAD output of TXLOAD 17-20 is applied via invertor buffer 17-14 to the clock inputs of each of the flip-flops, 17-1, 17-2, and 17-3 and serves as the clock signal for the modulator. The load output is also applied as an input to the LOAD input in the parallel to serial shift register 17-21 PSSHFT presented in block form. Accordingly reference may be made at this point to the detailed schematic diagram of shift register 17-21 presented in FIG. 19.

Figure 19:
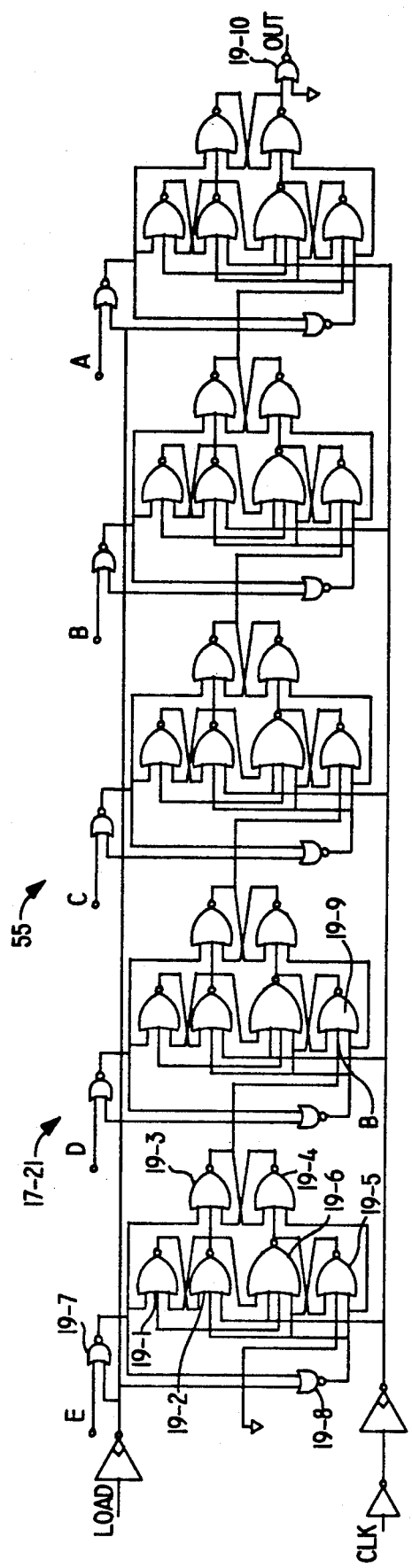
FIG. 19 is a more detailed schematic diagram of the parallel to serial shift register element of the modulator presented in FIG. 17 in block form.

As those skilled in the art appreciate, the circuit of FIG. 19 is a conventional parallel to serial shift register circuit formed of flip-flops and in which the flip-flops are in turned formed of combinations of conventional NOR gates. Taking the first of the five identical circuits to the left-hand side in the figure a flip-flop is formed of five triple input NOR gates, 19-1 through 19-5, and a four input NOR gate, 19-6, connected as illustrated. Two NOR gates, 19-7 and 19-8, serve as inputs to the respective flip-flop. The output of the flip-flop is taken at NOR gate 19-3 output and applied to the input of the next succeeding flip-flop section, namely input B of flip-flop 19-9. The shift register output is obtained at NOR gate 19-10, labeled OUT. Inputs are provided for the five bit word at E, D, C, B and A, and the load and clock inputs are applied at LOAD and CLK, shown to the left in the figure. For convenience, the remaining gates are not labeled as the elements and their relationships are clear from the illustration.

With a high input at E and an input at LOAD supplied by the load synchronizer, previously discussed in FIG. 18, NOR gate 19-7 supplies a high output that is input to input A of NOR gate 19-1 to input A of NOR gate 19-B and to input C of NOR gate 19-6 and to one of the two inputs of the dual input NOR gate 19-8. The second input of the latter NOR gate is also coupled to the LOAD input. As the reader appreciates, with suitable highs and lows presented at the five inputs A-E, the corresponding flip-flops in the register are toggled to represent the respective high or low condition. When the high input at LOAD is removed, the inputs at A-E are effectively isolated from the flip-flops and the flip-flops retain the voltage information previously inserted. Thereupon, clock signals at a 125 MHz rate step the flip-flops, resulting in the information being serially passed from stage to stage, left to right in the figure, with the information in the last stage to the right in the figure being outputted through NOR gate 19-10 to output OUT. After five cycles, the entire five bit word is serially read-out and the register is ready for the input of the next succeeding five bit parallel symbol.

Figure 20:
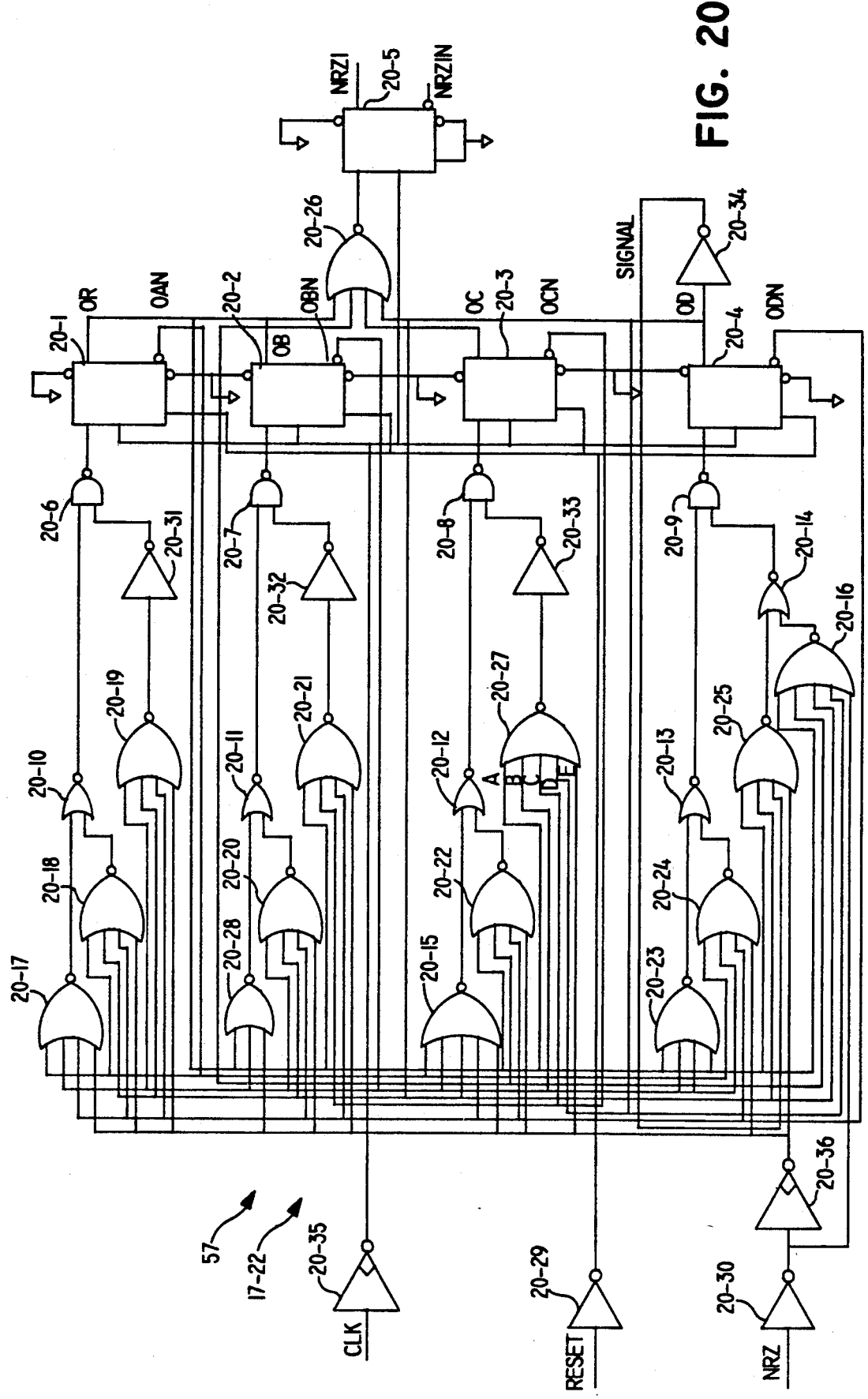
FIG. 20 is a more detailed schematic of the NRZI Encoder element of the modulator presented in block form in FIG. 17.

Returning momentarily to FIG. 17, the output of shift register 17-21 is inputted to the NRZ input of the NRZI Encoder 17-22, TXENCODE, illustrated in greater detail schematically in FIG. 20, to which reference may be made.

The NRZI Encode circuit, sometimes referred to as TX ENCODE, is also formed of digital components suitably NOR gates, NAND gates, flip-flops, inverters and invertor buffers. The circuit, as illustrated, contains five resettable D-type clocked flip-flops, 20-1 through 20-5, four dual input NAND gates, 20-6 through 20-9, five dual-input NOR gates, 20-10 through 20-14, three five input NOR gates, 20-15, 20-16 and 20-27, ten quad input NOR gates, 20-17 through 20-26, one triple input NOR gate, 20-28, seven inverters, 20-29 through 20-34, and two invertor buffers, 20-35 and 20-36. As those skilled in the art appreciate, the circuit illustrates a state machine. NRZ signals are input and applied via buffer 20-30 to NOR gate 20-16 and through invertor buffer 20-36 to the various inputs illustrated of NOR gates 20-25, 20-24, 20-23, 20-15, 20-22, 20-27, 20-28, 20-20, 20-21, 20-17, 20-18 and 20-19. The clock input at CLK is applied via the buffer to the clock input of each flip-flop. Accordingly, as the NRZ input signal levels are clocked into the state machine, the NRZI output will toggle from it's current level, if the input NRZ signal was a "1". If an NRZ "0" level is input, the NRZI output will remain in it's current state.

When ten or more consecutive NRZ bits have been input to the TXENCODE circuit, the state machine outputs "1" on NRZI (i.e. go to a "1" level or, if already outputting a "1", remain at a "1" level of output). This insures that when two or more QUIET symbols (all zeros) are loaded into the modulator for transmission that the output TX_SIG_TR level will indicate a "0" and thus not leave the fiber optic light transmitting element in an "on" position, wasting power.

Any suitable source of voltage required by the digital circuits may be applied. Suitably a single grounded three volt source is preferred. The entire modulator/demodulator circuit is fabricated on a single gallium arsenide chip which, in turn, is assembled into a conventional multi-lead package containing extending connector prongs, as is conventional in the industry. The chip measures 5.25 mm×4.8 mm in dimension.

As those skilled in the art appreciate, the modulator demodulator combination of the invention is especially useful as an element of a media access controller of a fiber optic data transmission system in the new high speed Token Ring Local Area Network. The media access controller is the data link "layer" responsible for scheduling and routing data transmissions on a shared medium local area network. It is, so to speak, the station along the network that interfaces the fiber optic network to associated equipment, such as a computer. The MAC provides access to the transmission medium essentially fiber optic cable, address recognition in data on the line, and generation and verification of frame check sequences. Its primary function is the delivery of data frames, including frame insertion, repetitions, and removal from trains of data passing around the ring.

The American National Standard Institute, ANSI, published a standard for a proposed new high speed Token Ring Local Area Network. Included are standards for the media access controller or "MAC", the lower sub-layer of the data link layer, DLL, for the fiber distributed data interface, FDDI, X3T9-89-100RAZ10, dated Feb. 28, 1986. The FDDI specification provides a high band-width, general purpose interconnection among computers and peripheral equipment using fiber optics as the transmission medium in a ring configuration. The band widths are on the order of 100 megabytes per second or greater. This standard establishes the connection for a large number of stations distributed over distances of several kilometers. Default values intended to accommodate ring networks of up to 1,000 physical connections, stations, and a total fiber optic path length of 200 kilometers are employed. Reference to that specification, known by those skilled in the art, should provide additional background helpful to those of lesser skills in understanding additional benefits of the present invention. In that system digital data is transmitted by modulating light, turning the light on and off so to speak at very high rates and converting the light pulses to electronic pulses: If one visualizes dividing one second of time into one million parts and then dividing again by one hundred, one may grasp the almost incomprehensible speeds at which the transmission system operates. The modulator demodulator of the present invention provides an improved media access controller that serves those purposes in the system.

CHART I
COUNTER 13 NEXT STATE TABLE

| Present State | | | Inputs | | Next State | | | Outputs | |
|---|---|---|---|---|---|---|---|---|---|
| A | B | C | INA.d | INB.d | A | B | C | DIR | EN |
| 0 | 0 | 0 | φ | 1 | 0 | 0 | 0 | 1 | 0 |
| 0 | 0 | 0 | φ | 0 | 0 | 0 | 1 | 1 | 0 |
| 0 | 0 | 1 | 1 | φ | 0 | 1 | 1 | 0 | 0 |
| 0 | 0 | 1 | 0 | φ | 1 | 0 | 0 | 1 | 1 |
| 0 | 1 | 0 | 1 | φ | 1 | 0 | 1 | 1 | 0 |
| 0 | 1 | 0 | 0 | φ | 1 | 1 | 0 | 0 | 1 |
| 0 | 1 | 1 | 1 | φ | 0 | 1 | 0 | 0 | 0 |
| 0 | 1 | 1 | 0 | φ | 0 | 0 | 0 | 1 | 0 |
| 1 | 0 | 0 | φ | φ | 0 | 0 | 0 | 1 | 0 |
| 1 | 0 | 0 | φ | φ | 0 | 0 | 0 | 1 | 0 |
| 1 | 0 | 1 | φ | φ | 0 | 0 | 1 | 1 | 0 |
| 1 | 0 | 1 | φ | φ | 0 | 0 | 1 | 1 | 0 |
| 1 | 1 | 0 | φ | φ | 0 | 0 | 0 | 1 | 0 |
| 1 | 1 | 0 | φ | φ | 0 | 0 | 0 | 1 | 0 |
| 1 | 1 | 1 | φ | φ | 0 | 0 | 0 | 1 | 0 |
| 1 | 1 | 1 | φ | φ | 0 | 0 | 0 | 1 | 0 |

STATE EQUATIONS $A = \overline{AB}\overline{C} + \overline{ABC(\overline{INA.d})}$ $B = \overline{ABC}(\overline{INA.d}) + \overline{AC}(INA.d)$ $C = \overline{ABC(INB.d)} + \overline{ABC}(INA.D) + A\overline{BC} + \overline{BC}(INA.d)$ INA.d represents the input INA delayed by one clock cycle
INB.d represents the input INB delayed by one clock cycle
CA = EN & B = DIR

CHART II
UP/DOWN COUNTER NEXT STATE TABLE
(Partial)

| Inputs | | Present State | | | | Next State | | | |
|---|---|---|---|---|---|---|---|---|---|
| q_dirl | q_en | Q⁰ | Q¹ | Q² | Q³ | Q⁰ | Q¹ | Q² | Q³ |
| 0 | 0 | 1 | 1 | 1 | 0 | 1 | 1 | 1 | 0 |
| 1 | 0 | 1 | 1 | 1 | 0 | 1 | 1 | 1 | 0 |
| 1 | 1 | 1 | 1 | 1 | 0 | 0 | 1 | 1 | 0 |
| 1 | 1 | 0 | 1 | 1 | 0 | 1 | 0 | 1 | 0 |
| 0 | 1 | 1 | 0 | 1 | 0 | 0 | 1 | 1 | 0 |
| 0 | 1 | 0 | 1 | 1 | 0 | 1 | 1 | 1 | 0 |
| 0 | 1 | 1 | 1 | 1 | 0 | 0 | 0 | 0 | 1 |
| 0 | 1 | 0 | 0 | 0 | 1 | 1 | 0 | 0 | 1 |
| 0 | 1 | 1 | 0 | 0 | 1 | 0 | 1 | 0 | 1 |

CHART III
SLIP BYTE CLOCK-43 NEXT STATE TABLE

| Present State | | | | Next State | | | Outputs |
|---|---|---|---|---|---|---|---|
| 14-30 A | 14-31 B | 14-32 C | Inputs JK | 14-30 A | 14-31 B | 14-32 C | DCLK1 |
| 0 | 0 | 0 | 0 | 0 | 0 | 1 | 0 |
| 0 | 0 | 0 | 1 | 1 | 0 | 0 | 1 |
| 0 | 0 | 1 | 0 | 0 | 0 | 1 | 0 |
| 0 | 0 | 1 | 1 | 0 | 0 | 0 | 0 |
| 0 | 1 | 0 | 0 | 1 | 1 | 0 | 1 |
| 0 | 1 | 0 | 1 | 0 | 1 | 1 | 1 |
| 0 | 1 | 1 | 0 | 0 | 0 | 0 | 0 |
| 0 | 1 | 1 | 1 | 0 | 0 | 0 | 0 |
| 1 | 0 | 0 | 0 | 1 | 1 | 0 | 1 |
| 1 | 0 | 0 | 1 | 0 | 1 | 0 | 1 |
| 1 | 0 | 1 | 0 | 1 | 0 | 1 | 1 |
| 1 | 0 | 1 | 1 | 0 | 1 | 0 | 1 |
| 1 | 1 | 0 | 0 | 1 | 1 | 1 | 1 |
| 1 | 1 | 0 | 1 | 1 | 1 | 1 | 1 |
| 1 | 1 | 1 | 0 | 1 | 0 | 1 | 1 |
| 1 | 1 | 1 | 1 | 1 | 0 | 1 | 1 |

STATE EQUATIONS $A = \overline{ABC(JK)} + AB + B\overline{C}(\overline{JK}) + A\overline{C}(\overline{JK})$
$B = BC + AB$
$C = AB + BC + B\overline{C}(JK) + \overline{AB}(\overline{JK})$
OUTPUT
$DCLK1 = A + B$
JK represents the signal at the output of the NAND gate fed by the JKMATA and JKMATB signals.

CHART IV

| PRESENT STATE | | | NEXT STATE | | | OUTPUTS | |
|---|---|---|---|---|---|---|---|
| 16-2 qa | 16-3 qb | 16-4 qc | 16-2 aq | 16-3 qb | 16-4 qc | IND_OUT | DCLK1 |
| 0 | 0 | 0 | 0 | 0 | 1 | 0 | 1 |
| 0 | 0 | 1 | 0 | 1 | 1 | 0 | 1 |
| 0 | 1 | 0 | 1 | 0 | 0 | 1 | 0 |
| 0 | 1 | 1 | 0 | 1 | 0 | 1 | 0 |
| 1 | 0 | 0 | 0 | 0 | 0 | 1 | 0 |
| 1 | 0 | 1 | 0 | 0 | 0 | 1 | 0 |
| 1 | 1 | 0 | 0 | 0 | 0 | 1 | 0 |
| 1 | 1 | 1 | 0 | 0 | 0 | 1 | 0 |

CHART V
TXLOAD -53 NEXT STATE TABLE

| CURRENT STATE | | | IN | NEXT STATE | | | OUT | |
|---|---|---|---|---|---|---|---|---|
| 18-1 | 18-2 | 18-3 | REQ | 18-1 | 1802 | 18-3 | LOAD | CONF_INV |
| 0 | 0 | 0 | 0 | 1 | 0 | 0 | 0 | 0 |
| 0 | 0 | 0 | 1 | 1 | 0 | 0 | 0 | 0 |
| 0 | 0 | 1 | 0 | 0 | 1 | 1 | 0 | 1 |
| 0 | 0 | 1 | 1 | 0 | 0 | 0 | 1 | 0 |
| 0 | 1 | 0 | 0 | 0 | 0 | 1 | 0 | 1 |
| 0 | 1 | 0 | 1 | 0 | 0 | 1 | 0 | 1 |
| 0 | 1 | 1 | 0 | 1 | 1 | 0 | 0 | 1 |
| 0 | 1 | 1 | 1 | 1 | 1 | 0 | 0 | 1 |
| 1 | 0 | 0 | 0 | 1 | 1 | 0 | 0 | 1 |
| 1 | 0 | 0 | 1 | 1 | 1 | 0 | 0 | 1 |
| 1 | 0 | 1 | 0 | 0 | 0 | 1 | 0 | 1 |
| 1 | 0 | 1 | 1 | 0 | 0 | 1 | 0 | 1 |
| 1 | 1 | 0 | 0 | 1 | 1 | 1 | 0 | 1 |
| 1 | 1 | 0 | 1 | 1 | 1 | 1 | 0 | 1 |
| 1 | 1 | 1 | 0 | 1 | 0 | 1 | 0 | 1 |
| 1 | 1 | 1 | 1 | 1 | 0 | 1 | 0 | 1 |

It is believed that the foregoing description of the preferred embodiments of the invention is sufficient in detail to enable one skilled in the art to make and use the invention. However, it is expressly understood that the detail of the elements which are presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An improved wholly digital demodulator for recovering data symbols from bits in a serial data stream transmitted at a predetermined clock rate, each data symbol being defined by a N-bit digital word comprising:

feedback means for sampling the duration of the bits in the serial data stream at a sampling rate substantially greater than said clock rate and transforming sampled bits of irregular duration into bits having a preselected uniform duration defining the N-bit data symbol wherein the feedback means does not require every bit in the serial data stream to have either a rising edge or a falling edge; and output means for outputting said data symbol in parallel data format, with said demodulator means being formed within a single substrate of semiconductor material.

2. The invention as defined in claim 1 wherein said demodulator further includes: first clock means for supplying clock pulses to the demodulator; and further comprising in combination therewith: modulator means for converting data symbols in parallel data format into a serial data stream and outputting said serial data stream; and wherein said first clock means further supplies clock pulses to said modulator means.

3. The invention as defined in claim 1 wherein said feedback means includes means for sequentially taking and temporarily storing in sequence multiple samples of each digital bit contained within said serial data stream.

4. An asynchronous digital demodulator, said demodulator having an input for receiving a serial digital data stream in which individual symbols of data within the data stream are represented by groups of N digital bits serially arranged with each bit thereof being of a digital high or a digital low, with said serial digital data stream being transmitted at a predetermined clock rate, T, and said demodulator having an output for outputting a corresponding parallel digital data stream in which individual symbols of data are represented by a group of N digital bits presented simultaneously in parallel with said parallel digital data stream being transmitted at a lesser clock rate of T(B), wherein digital symbol information in said serial digital data stream is converted thereby from serial form to parallel form; said digital demodulator being formed as a monolithic assembly in a substrate of semiconductor material, said demodulator including:

input means for receiving said serial digital data stream of digital bits representing data symbols;

first register means;

sampling means for continuously sampling said serial digital data stream at a sampling rate of T(A), with T(A) being at least Y times greater than said clock rate T, where Y is a whole number no less than 4, to provide at least Y samples of each data bit in said serial digital data stream, wherein each such sample ideally represents a fractional portion of a digital bit, and entering said samples, sequentially, into said first register means;

said first register means being of a multi-stage serial to parallel shift register type, said first register means having stages sufficient in number to temporarily simultaneously hold a quantity of samples representing a portion of said serial digital data stream with said portion comprising no less than one and one half N bit symbols; said first register means being clocked by said sampling means to serially advance samples into and through said stages of said first register means;

said first register means including a first plurality of Y outputs for presenting thereat in parallel a series of Y consecutive samples, appearing in the later stages of said first register means, as output, whereby samples of said serial data stream are entered into and paraded through the stages of said register means and are momentarily presented in sequence at each of said first plurality of outputs;

converter means coupled to said first plurality of Y sample outputs from said first register means for converting Y consecutive samples appearing at said first plurality of outputs at a given moment of time into a corresponding digital bit and for accumulating a consecutive sequence of N such digital bits to form an N bit parallel digital word, representative of a symbol and, responsive to formation of a digital word, for outputting said N bit parallel digital word therefrom at a transmission rate of T(B), in which said rate T(B) is a rate equal to T/N, whereby successive conversion of groups of Y samples by said convertor means is used to produce a parallel digital data stream; and wherein said demodulator samples the duration of the bits in the serial data stream and transforms sampled bits of irregular duration into bits having a preselected uniform duration defining the N-bit data symbol.

5. The invention as defined in claim 4 wherein said convertor means further includes:

first replicator means responsive to said first plurality of said first register means outputs for forming a corresponding serial sample stream, whereby said serial sample stream is representative of a corresponding portion of the digital data in the serial data stream input to the demodulator;

transforming means responsive to said first replicator means for transforming said serial sample stream received from said first replicator means to a corresponding serial data bit stream of digital bits and outputting said serial data bit stream;

second register means coupled to said transforming means for receiving and temporarily storing said serial data bit stream;

said second register means being of the serial to parallel shift register type having an input for serially receiving a plurality of serial data bits, said plurality being greater than N, and a plurality of N outputs for outputting N consecutive data bits, representative of a symbol, in parallel;

third register means, said third register means being of a parallel to parallel shift register type; said third shift register means being coupled to said second register means for receiving N bit parallel data word outputs from said second register means and producing and transmitting a corresponding parallel data word stream, whereby consecutive N bit words transmitted by said first parallel to parallel register means defines a parallel digital data stream transmitted at a T(B) clock rate.

6. The invention as defined in claim 4, wherein said sampling means comprises:

first clock means for providing clock pulses at a rate of T(A), with each said clock pulse being a duration that is a predetermined fraction of the duration of a data bit within said serial data stream;

means coupling said first clock means to said first register means for enabling the input of said first register means to permit said first register means to input the digital high or low condition present at said input of said first register means for the duration of the clock pulse to thereby define a sample portion of a digital bit from said serial data stream and for clocking said first register means to advance the position of prior samples entered within the stages of said first register means from one stage to the next stage;

second clock means coupled to the output of said first clock means for producing clock pulses at the rate of T, said second clock means including: divider means for dividing the output of said first clock means T(A) by Y to derive said clock pulses at the serial transmission rate T;

third clock means for producing clock pulses at the rate of T(B), said third clock means including divider means for dividing the output of said second clock means by N; whereby said first, second and third clock means are coupled in phase relationship; and wherein said converter means includes:

first replicator means responsive to said first plurality of said first register means outputs for forming a corresponding serial sample stream, whereby said serial sample stream is representative of a corresponding portion of the digital data in the serial data stream input to the demodulator;

transforming means responsive to said first replicator means for transforming said serial sample stream received from said first replicator means to a corresponding serial data bit stream of digital bits and outputting said serial data bit stream;

second register means coupled to said transforming means for receiving and temporarily storing said serial data bit stream;

said second register means being of the serial to parallel shift register type having an input for serially receiving a plurality of serial data bits, said plurality being greater than N, and a plurality of N outputs for outputting N consecutive data bits, representative of a symbol, in parallel;

third register means, said third register means being of a parallel to parallel shift register type; said third shift register means being coupled to said second register means for receiving N bit parallel data word outputs from said second register means and producing and transmitting a corresponding parallel data word stream responsive to receiving a clock pulse from said second clock means, whereby consecutive N bit words transmitted by said first parallel to parallel register means with each pulse of said second clock means defines a parallel digital data stream transmitted at a T(B) clock rate.

7. The invention as defined in claim 5 wherein said converter means includes:

pulse width inspecting means for inspecting a group of said samples in the initial stages of said first register means to determine whether such group of samples is representative of a digital bit of predetermined standard bit width and for providing an output indicative thereof, said output being indicative of the inspected samples defining a digital bit of a width greater than, equal to, or less than said standard bit width, whereby any need for correction in bit width may be initiated; and pulse width adjusting means coupled to said first replicator means and responsive to said pulse width inspecting means for causing said replicator means to sequentially reproduce the quantity of serial samples representative of a digital bit of said standard width from among said samples outputted from said plurality of Y outputs of said first register means, whereby said serial sample stream outputted by said replicator means contains samples defining digital data bits of standard width.

8. The invention as defined in claim 5, wherein said converter means further includes:

means for adjusting the number of said samples as thereby defines a digital bit to ensure generation of digital bits of standard width.

9. The invention as defined in claim 4 wherein said sampling means comprises:

first clock means for providing clock pulses at a rate of T(A), with each said clock pulse being a duration that is a predetermined fraction of the duration of a data bit within said serial data stream;

means coupling said first clock means to said first register means for enabling the input of said first register means to permit said first register means to input the digital high or low condition present at said input of said first register means for the duration of the clock pulse to thereby define a sample of a digital bit from said serial data stream and for clocking said first register means to advance the position of prior samples entered within the stages of said first register means from one stage to the next stage.

10. The invention as defined in claim 7, wherein said first register means includes further:

a second plurality of outputs for outputting a series of Y consecutive samples in parallel; said second plurality of outputs being taken from initial stages within said first register means preceding those latter stages therein, which provide said first plurality of outputs, to thereby access said Y samples prior to the advancement of said samples into said later stages of said first register means; and wherein said inspecting means comprises:

edge detector means coupled to said second plurality of outputs of said first register means for inspecting said portion of samples represented at said second outputs of said first register means to detect the existence in said portion of samples of a transition from a voltage high to a voltage low and vice-versa, representative of a leading end or a trailing end, respectively, of a digital bit contained within said portion of said samples, and providing an output representative thereof; whereby the existence of a digital bit in said samples is defined prior to the time said inspected portion of samples advances into said latter stages of said first register means.

11. The invention as defined in claim 7, wherein said first register means includes further:

a second plurality of outputs for outputting a series of Y consecutive samples in parallel; said second plurality of outputs being taken from initial stages within said first register means preceding those latter stages therein, which provide said first plurality of outputs, to thereby access said Y samples prior to the advancement of said samples into said latter stages of said first register means; and wherein said inspecting means comprises:

edge detector means coupled to said second plurality of outputs of said first register means for inspecting said portion of samples represented at said second outputs of said first register means to detect the existence in said portion of samples of a transition from a voltage high to a voltage low and vice-versa, representative of a leading end or a trailing end, respectively, of a digital bit contained within said portion of samples, and providing an output representative thereof; whereby the existence of a digital bit in said samples is defined prior to the time said inspected portion of samples advances to said later stages of said first register means;

first counter means coupled to said edge detector means for decoding the output of said edge detector means and producing an output representative of the width of the digital bit defined between adjacent edges detected by said edge detector means with said output signifying a count up by one responsive to said width being greater than a predetermined standard width, count down by one responsive to said width being lesser than a predetermined standard width or, alternatively, no count representative of said width being of the predetermined standard width;

up/down counter means responsive to output of said first counter means for counting up or down from an initial count in the amount represented by said output of said first counter means to produce a coded output representative of changes to be made thereby in the pulse width of said inspected portion of samples, with said up/down counter providing an initial code output representative of a normal digital bit; and wherein said replicator means comprises further:
multiplex selector means;
said multiplex selector means including a first plurality of sample inputs coupled to the respective first plurality of outputs of said first register means to replicate the samples represented at said respective outputs of said first register means and an output for outputting samples appearing at a selected one of said inputs;
said plurality of sample inputs being coupled to corresponding ones of said first plurality of said first register means outputs; whereby the samples presented at said selected sample inputs change and the output of the multiplex selector means changes accordingly as said samples in said first register means are advanced through said first register means;
said multiplex selector means containing further:
selection means for selecting the respective one of said first plurality of inputs for connection to said output; and decoder means, said decoder means being responsive to the output of said up/down counter means for causing said selection means to select the one of said plurality of multiplex selector means inputs represented by said code input for connection to said multiplex selector means output, whereby the quantity of reproduced samples outputted by said multiplex selector means during a defined time interval may be lengthened or shortened as determined to be necessary by said up/down counter means to thereby ensure output of the proper number of samples representing a digital bit of standard width.

12. The invention as defined in claim 11, wherein said inspecting means further comprises:
feedback means responsive to an output from said up/down counter means for temporarily preventing said first counter means from changing the input of said up/down counter means.

13. The invention as defined in claim 12 wherein said feedback means further comprises:
first feedback means, said first feedback means being located in between said first counter means first output and a first input of said up/down counter;
said first feedback means including:
first feedback serial to parallel register means having multiple register stages for receiving samples serially and a plurality of outputs representative of the samples contained in each stage of said multiple register stages;
first feedback multiplex selector means having multiple inputs, an output and selector means for selecting one of said multiple inputs for connection to said output; said first feedback multiplex selector means having its inputs connected to the corresponding outputs of said first feedback serial to parallel register means;
first feedback decoder means having an input coupled to the output of said up/down counter means and an output coupled to said selector means of said first feedback multiplex selector means for causing said selector means of said first feedback multiplex selector means to select a particular one of the multiplex selector means inputs for connection to said multiplex selector means output;
second feedback means, said second feedback means being located in between said first counter means second output and a second input of said up/down counter;
said second feedback means including:
second feedback serial to parallel register means having multiple register stages for receiving samples serially and a plurality of outputs representative of the samples contained in each stage of said multiple register stages;
second feedback multiplex selector means having multiple inputs, an output and selector means for selecting one of said multiple inputs for connection to said output; said second feedback multiplex selector means having its inputs connected to the corresponding outputs of said second feedback serial to parallel register means; and
second feedback decoder means having an input coupled to the output of said up/down counter means and an output coupled to said selector means of said second feedback multiplex selector means for causing said selector means of said second feedback multiplex selector means to select a particular one of the multiplex switch inputs for connection to the multiplex switch output.

14. The invention as defined in claim 4, wherein said serial data stream is formed according to a protocol in which predefined symbols and groups of symbols represent conditions, including a first predetermined group of symbols representing an idle condition in which the serial data stream is operative and is not transmitting recognizable intelligence, and a second predetermined group of symbols represents the start of a message, with said message comprising a group of symbols containing recognizable intelligence, and further including:
start of message detector means coupled to said convertor means for detecting the presence of a sequence of symbols in said corresponding serial data stream representative of a J and a K symbol in sequence; and
means for detecting the existence of an IDLE symbol.

15. The invention as defined in claim 14 wherein said converter means includes:

second register means coupled to said transforming means for receiving and temporarily storing said serial data stream;

said second register means being of the serial to parallel type having multiple stages sufficient to hold at least two N bit symbols, an input for serially receiving serial data bits and a plurality of N outputs for outputting N consecutive data bits, representative of a symbol, in parallel;

first parallel to parallel register means coupled to said second register means for receiving an N bit parallel data word output from said second register means and producing and transmitting a parallel data stream at a T(B) clock rate; and wherein said start of message detector means includes means connected to at least N consecutive stages in said second register means for providing output upon detection of said symbol in said N consecutive stages.

16. The invention as defined in claim 15 wherein said start of message detector means includes:

first decoder means coupled to first group of N stages of said second register means for detecting a J symbol;

second decoder coupled to a second group of N stages of said second register means for detecting a K symbol; and And gate means for providing indication of concurrent detection of J and K symbols.

17. The invention as defined in claim 15, further including:

second clock means coupled to the output of said first clock means for producing clock pulses at the rate of T, said second clock means including: divider means for dividing the output of said first clock means T(A) by Y to derive said clock pulses at the serial transmission rate T;

third clock means for producing clock pulses at the rate of T(B), said third clock means including divider means for dividing the output of said second clock means by N; whereby said first, second and third clock means are coupled in phase relationship.

18. The invention as defined in claim 11 wherein said first register means further includes:

a P0 output coupled to an initial stage, P0, of said first register means to provide initial indication of entry of samples within said first register means; and wherein said up/down counter means includes:

initialization means responsive to said P0 output of said first register means for setting the up/down counter to a predetermined initial position to initially provide a multi-bit code output representative of a predetermined mid-count.

19. The invention as defined in claim 18, wherein said up/down counter means includes:

a P0 input for receiving said P0 output of said first register means, with said P0 means being coupled to said initialization means; and wherein said invention further includes:

delay means coupled between said P0 output of said first register means and said up/down counter means P0 input for delaying application of said output to said up/down counter input.

20. The invention as defined in claim 19 wherein said delay means comprises further:

first gate means responsive to said P0 output of said first register means for providing an output following a predetermined delay of less than forty nanoseconds after receipt said P0 output;

serial to parallel register means coupled to said output of said first gate means for receiving and temporarily storing a plurality of samples output from said first gate means, said serial to parallel register means including at least N clocked flip flops with each of said flip flops having a clock input, a data input, and an output;

said second clock means being connected to said clock inputs of said flip flops for providing clock pulses thereto at the T rate;

gate means coupled to the outputs of said serial to parallel register means responsive to the appearance of a sample in any position within said register means upon receipt of a clock input from said second clock means for producing an output; whereby any output of said delay means is thereby synchronized to commence with the appearance of a pulse from said second clock means.

21. The invention as defined in claim 19 further comprising: idle detection circuit means for detecting activity in said first shift register means, said idle detection circuit means including:

a P0 input for receiving pulses from the P0 stage of said first shift register means; and wherein said up/down counter means includes:

a idle input for receiving an indication of an idle condition from said idle detection circuit means;

an overcount indication input for receiving any overcount condition indication from said multiplex selector means;

a first data input for receiving one of the two outputs from said bit counter means;

a second data input for receiving the second of the two outputs from said bit counter means;

state machine means for determining a direction and count in response to concurrent inputs at said first and second data inputs and providing a multi-bit code output representative thereof; said state machine means further including means responsive to an input from any of said idle and overcount indication inputs for providing a multi-bit code output representative of a predetermined mid-count irrespective of the presence of any inputs at said first and second data inputs; and wherein said first register means includes:

a P0 output coupled to an initial stage, P0, of said first register means to provide indication of entry of samples within said first register means; and wherein said idle detection circuit means further includes:

delay means coupled to said P0 output of said first register means and the output of said second clock means for applying any pulse from said P0 output of said first shift register means to the P0 input of said up/down counter means only following the appearance of the clock pulse from said second clock means at said second clock means input of said up/down counter means.

22. The invention as defined in claim 21 wherein said up/down counter means further includes:

a clock input for receiving clock pulses from said first clock means; and wherein said state machine means is connected to said clock input for initiating output responsive to clock pulses at said clock input to thereby synchronize said output with said clock pulse.

23. The invention as defined in claim 16 wherein said third clock means for providing clock pulses at a T(B) rate, comprises:
a first clock input for receiving clock pulses from said second clock means, whereby by clock pulses at a rate of T are received at said first clock input;
second input means for receiving signals from said JK symbol detector output;
reset input;
an output;
state machine means containing a plurality of resettable clocked flip flops with the clock inputs thereof being connected to said first clock input; said state machine means being responsive to said first clock signals at said clock input and said signals at said second input representative of the detection of said JK symbols in sequence for creating thereby output pulses defining a T(B) clock rate with said output pulses having a nominal width in the absence of detection of said JK symbols and with the width of said output pulses being changeable in dependence upon the time of occurrence of said JK signal detection and applying said derived output pulses to said output.

24. The invention as defined in claim 4 wherein said number N is equal to 5; said serial transmission rate, T, is equal to 125 MHz and wherein said number Y is equal to 4.

25. The invention as defined in claim 4 wherein said first register means comprises:
a plurality of twenty clocked flip flops arranged in a chain like fashion and defining a serial to parallel shift register;
an input to the initial one of said flip flops;
a plurality of outputs;
a clock input for connection to said first clock means;
said first plurality of outputs comprising eleven outputs taken from the last eleven flip flops;
said second plurality of outputs comprising four outputs taken from the fourth through seventh flip flops; and
a third output taken from the second flip flop in the chain;
said register having flip flops located between said fourth through seventh flip flops and said last eleven flip flops and having at least two flip flops located between said second flip flop and said fourth flip flop.

26. The invention as defined in claim 9 wherein said multiplex selector means includes:
clock input for connection to said first clock means for receiving inverted clock pulses thereby;
a plurality of N inputs coupled to the respective plurality of second outputs of said first shift register means for reproducing the samples stored in said first shift register means at said multiplex selector input, whereby as the first shift register means continues to advance samples therethrough in accordance with clock pulses received thereby from said first clock means, the samples on said multiplex selector inputs change accordingly at the T(A) clock rate;
a code input for connection to the code output of said up/down counter means;
a reset input;
a multiplex selector output;
first output;
a second multiplex selector output;
logic circuit means responsive to said code input selecting one of said selector inputs for reproduction at said first multiplex selector output, said logic circuit means including means for monitoring said selected input and reproducing the voltage level of the samples produced on said selected input in sequence at said first multiplex selector output to thereby create a serial sample stream of the T(A) clock rate at said multiplex selector output;
said logic circuit including means for detecting a code input representative of a non-existent line greater or lesser range of values than permissible or detecting a reset input for applying an output to said second overflow indicating output to thereby indicate that the multiplex selector circuit is to be reset;
whereby the code initially provided represents a line number for a standard width bit and wherein increasing the number of the line monitored by said multiplex selector effectively increases the width of the bit represented by the samples, and decreasing the number of the line monitored effectively shortens the width of the digital bit represented by the samples;

27. The invention as defined in claim 9 wherein said data clock means comprises:
a data clock first input;
a data clock second input for receiving input of clock pulses at a rate of T(A) from said first clock means;
first, second, third and fourth clocked resettable flip flops with each of said flip flops having a D input, a reset input, an output and a complementary output;
said first flip flop having its D input coupled to data clock input; and having said data clock second input coupled to said clock input for applying thereto clock pulses at a rate of T from said second clock source;
means for inverting and applying said inverted output of said first flip flop to the clock input of each of said second, third and fourth flip flops;
first triple input Nor gate means;
second and third dual input Nor gate means;
said triple input Nor gate means having a first input connected in common with said first inputs of said second and third Nor gate means and the output of said second flip flop;
means connecting the complementary output of said third flip flop to the second input of said first Nor gate means;
means connecting the output of said fourth flip flop to the third input of said first Nor gate means;
means coupling the complementary output of said fourth flip flop also to the second input of said second Nor gate means;
means connecting the second input of said third Nor gate means to the output of said third flip flop;
invertor buffer means connected to the complementary output of said fourth flip flop for providing a pulse output at a rate of T(B) defining a third clock means;
invertor means connected to the output of said invertor buffer means;
a reset input;
means for coupling the reset input to the corresponding reset inputs of each of said first through fourth flip flops for restoring said flip flops to a normal condition responsive to a reset pulse applied at said reset input.

28. The invention as defined in claim 9 wherein said converter means further comprises:
   serial to parallel shift register means containing a plurality of flip flops connected in chain like fashion with said plurality exceeding 3N in number, said register means including an input for serially inputting digital bits representing a voltage high or low, a clock input for receiving clock pulses from said first clock source at a rate of T(A) to gate said flip flops and cause said information in said register to advance in position therein from one flip flop to the next; a first plurality of N outputs coupled to the final N flip flops of said register means for outputting the N bit word in parallel form;
   first decoder means coupled to a first group of N flip flops of said serial to parallel register means for determining the presence of a predetermined K symbol and provide an output indicative thereof;
   second decoder means coupled to a second group of N flip flops of said register for determining the presence of a predetermined J symbol and provide an output indicative thereof;
   third decoder means coupled to said flip flops of said register for determining the presence of bits representing a predetermined IDLE symbol and providing an output indicative thereof;
   clocked flip flop means having a clock input for receiving clock pulses at a rate of T(A) from said first clock source means having an input connected to said decoder means; and having an output for coupling an output indicative of the presence of an IDLE symbol detection at an input;
   buffer means coupled to said register and said second clock for receiving and temporarily holding said first plurality of register outputs and for outputting said N bits in parallel form responsive to a clock pulse from said second clock signal means, whereby said N bits is outputted in synchronism with said second clock.

* * * * *